United States Patent [19]
Fukui et al.

[11] Patent Number: 5,612,598
[45] Date of Patent: Mar. 18, 1997

[54] VIBRATION DRIVEN MOTOR

[75] Inventors: Hajime Fukui, Tokyo; Akio Atsuta; Fumikazu Nishikawa, both of Yokohama, all of Japan

[73] Assignee: Canon Kabushiki Kaisha, Tokyo, Japan

[21] Appl. No.: 998,615

[22] Filed: Dec. 30, 1992

[30] Foreign Application Priority Data

Jan. 8, 1992 [JP] Japan .................................. 4-001757

[51] Int. Cl.$^6$ ...................................................... H02N 1/00
[52] U.S. Cl. .......................... 318/116; 318/560; 318/561; 310/316
[58] Field of Search .................... 318/460, 116, 318/118; 310/310–330, 366; 307/30–66

[56] References Cited

U.S. PATENT DOCUMENTS

| | | | |
|---|---|---|---|
| 4,713,571 | 12/1987 | Suzuki et al. | 310/316 |
| 4,749,896 | 6/1988 | Suzuki et al. | 310/316 |
| 4,794,294 | 12/1988 | Shimizu et al. | 310/116 |
| 4,812,699 | 3/1989 | Ogawa et al. | 310/316 |
| 4,853,578 | 8/1989 | Takahashi et al. | 310/315 |
| 4,853,579 | 8/1989 | Kawasaki et al. | 310/116 |
| 4,888,514 | 12/1989 | Takahashi et al. | 310/316 |
| 4,914,337 | 4/1990 | Takagi | 310/316 |
| 4,926,084 | 5/1990 | Furutsu et al. | 310/316 |
| 4,965,481 | 10/1990 | Kashiyama | 310/316 |
| 4,977,507 | 12/1990 | Matsuoka et al. | 364/424.05 |
| 5,061,882 | 10/1991 | Takagi | 318/116 |
| 5,079,437 | 1/1992 | Monroe | 307/38 |
| 5,099,180 | 3/1992 | Noguchi | 318/116 |
| 5,130,619 | 7/1992 | Izuno | 318/116 |
| 5,140,231 | 8/1992 | Kashiyama | 310/316 X |
| 5,146,143 | 9/1992 | Furutsu | 318/116 |
| 5,159,253 | 10/1992 | Shimizu et al. | 318/606 |
| 5,165,047 | 11/1992 | Shimizu | 318/116 |
| 5,173,631 | 12/1992 | Suganuma | 310/316 |
| 5,376,855 | 12/1994 | Suganuma | 310/316 |

*Primary Examiner*—Paul Ip
*Attorney, Agent, or Firm*—Fitzpatrick, Cella, Harper & Scinto

[57] ABSTRACT

A drive frequency control system is used for a vibration driven motor including a vibrating member which generates a vibration therein upon application of a frequency signal to an electro-mechanical energy conversion element therein, and which uses the vibration as a driving force. The system includes a power supply circuit for supplying an electric power to the vibration driven motor, and a detection circuit for detecting a power supply voltage level of the electric power supplied by the power supply circuit, the detection circuit determining whether the power supply voltage level is less than a predetermined voltage level. A control circuit performs frequency control of the frequency signal of the basis of the determination of the detection circuit.

25 Claims, 18 Drawing Sheets

5,612,598

VIBRATION DRIVEN MOTOR

BACKGROUND OF THE INVENTION

1. Field of the Invention

The present invention relates to a vibration wave motor (vibration driven motor) driving control apparatus.

2. Related Background Art

In a conventional driving circuit for a vibration wave motor, the frequency of a driving frequency voltage of the vibration wave motor is limited by, e.g., a method of detecting a phase difference between the driving frequency voltage and a so-called sensor electrode for detecting a vibration state of a vibrating member of the vibration wave motor, a method of detecting the amplitude of a signal generated in a sensor electrode, or the like.

These methods include a countermeasure for preventing the rotation of the motor from being immediately stopped when the frequency of the driving voltage becomes lower than a given driving frequency in the characteristics of the vibration wave motor.

In general, a considerably high voltage is required to drive a vibration wave motor. Therefore, the following means are required. That is, a battery voltage must be boosted to a voltage level required for driving the vibration wave motor using, e.g., a DC/DC converter for boosting the driving voltage, a transformer for boosting the driving frequency voltage, or a high-voltage battery.

Therefore, when, for example, a DC/DC converter is used as a driving power supply, a large-capacity and expensive DC/DC converter must be adopted so as to assure a sufficient secondary voltage even when a supply voltage from a primary side battery drops. When a high-voltage battery is used, a large-capacity and expensive battery must also be used so as to supply a sufficient electric power to the vibration wave motor.

Therefore, when a power supply having sufficient performance cannot be used due to limited cost or space, the following problem is posed. When the output voltage of the vibration wave motor driving power supply drops due to a decrease in input voltage or an increase in load, the rotation speed of the vibration wave motor is decreased. In order to compensate for the decrease in rotation speed of the motor, when the frequency is swept or shifted toward the low frequency side, an electric power is further supplied to the vibration wave motor, and the output voltage is further decreased. As a result, the rotation of the vibration wave motor maybe undesirably stopped, due to a cause different than the above-mentioned phase difference between the driving frequency voltage and the sensor electrode. Therefore, the rotation stop phenomenon of the vibration wave motor cannot be prevented by the above-mentioned conventional control methods.

SUMMARY OF THE INVENTION

One aspect of the present invention is to provide a vibration wave motor driving control apparatus, which does not require a large-capacity power supply, and is free from the rotation stop phenomenon of a vibration wave motor.

According to one aspect of the application, present invention a driving control apparatus comprises an output voltage drop detection means for detecting an output voltage drop of a driving voltage generation power supply for a vibration wave motor, and a driving frequency setting means for shifting the driving frequency of the vibration wave motor upward by a predetermined amount, when the output voltage of the vibration wave motor is detected, thereby preventing the motor from being stopped. According to one aspect of the application, the apparatus comprises means for, when the output voltage drop of the vibration wave motor is detected, inhibiting the driving frequency of the vibration wave motor from being swept toward the low frequency side, thereby preventing the immediate rotation stop phenomenon of the vibration wave motor.

Other objects of the present invention will become apparent from the following description of the embodiments taken in conjunction with the accompanying drawings.

DETAILED DESCRIPTION OF THE PREFERRED EMBODIMENTS

Figure 1:
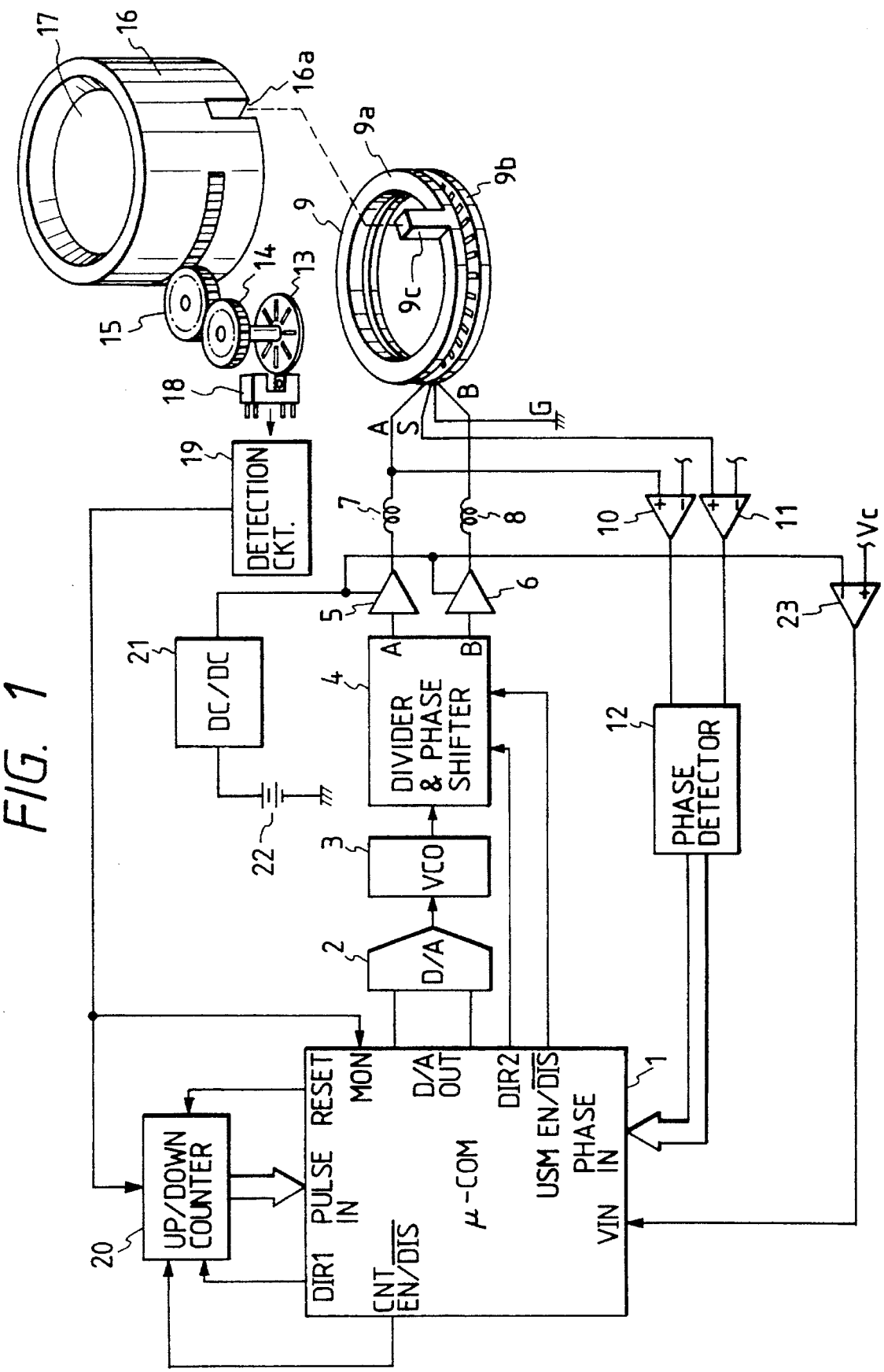
FIG. 1 is a block schematic diagram showing a first embodiment of the present invention.

FIG. 1 is a schematic block diagram showing the arrangement of a motor driving control apparatus and a vibration wave motor according to the first embodiment of the present invention. In FIG. 1, a D/A converter 2 converts a digital output signal from a microcomputer 1 into an analog voltage.

A voltage controlled oscillator (VCO) 3 generates a frequency voltage according to the output voltage from the D/A converter 2.

A divider & phase shifter 4 frequency-divides the frequency voltage output from the VCO 3, and outputs frequency voltages having $\pm\pi/2$ phase differences.

Power amplifiers 5 and 6 amplify the frequency voltages from the divider & phase shifter 4 to voltage and current values capable of driving a vibration wave motor 9.

Matching coils 7 and 8 are connected to the vibration wave motor 9. The vibration wave motor 9 has a rotor 9a, a stator 9b, and a key 9c for transmitting the rotation force of the motor to a lens barrel 16. Voltage comparators 10 and 11 are also connected to the vibration wave motor 9. A phase detector 12 detects the phases of one of driving frequency voltage and the sensor electrode (S phase), and outputs these phases as digital signals to the microcomputer 1.

A pulse plate 13 is rotated in cooperation with the outer circumferential gear portion of the lens barrel 16 via gears 14 and 15.

A lens 17 is fitted in the lens barrel 16. An interrupter 18 detects the rotation of the pulse plate 13, i.e., the rotation of the vibration wave motor 9. A signal detection circuit 19 amplifies a weak signal output from the interrupter 18, and converts it into a digital signal.

An up/down counter 20 counts pulse signals generated upon rotation of the pulse plate 13.

A DC/DC converter 21 generates a voltage necessary for driving the vibration wave motor from a battery 22. A voltage detection circuit (or comparator) 23 generates a Lo (low)-level output when the output voltage from the DC/DC converter 21 is higher than a given voltage; and generates a Hi (high)-level output when the output voltage is lower than the given voltage.

The functions of the terminals of the microcomputer 1 will be described below.

The microcomputer 1 has an input terminal VIN for receiving a discrimination result from the voltage detection circuit 23, an input terminal PHASE IN for reading phase values detected by the phase detector 12, an output terminal USM EN/$\overline{\text{DIS}}$ for enabling/disabling the driving operation of the vibration wave motor 9, an output terminal DIR2 for setting the rotational direction of the vibration wave motor 9, an output terminal D/A OUT for outputting a signal to the D/A converter 2, a direct input terminal MON for receiving a signal output from the detection circuit 19, and an output terminal RESET for resetting the up/down counter 20. When the output from the output terminal RESET is at Hi level, the counter 20 is reset.

The microcomputer 1 also has an input terminal PULSE IN for receiving a count value from the up/down counter 20, and an output terminal DIR1 for setting a count direction of the up/down counter 20. When the output from the output terminal DIR1 is at Hi level, the counter 20 performs a count-up operation; when it is at Lo level, the counter 20 performs a count-down operation.

The microcomputer 1 further has an output terminal CNT EN/$\overline{\text{DIS}}$ for disabling/enabling the count operation of the up/down counter 20. When the output from the output terminal CNT EN/$\overline{\text{DIS}}$ is at Hi level, the count operation is enabled; when it is at Lo level, the count operation is disabled.

Figure 2:
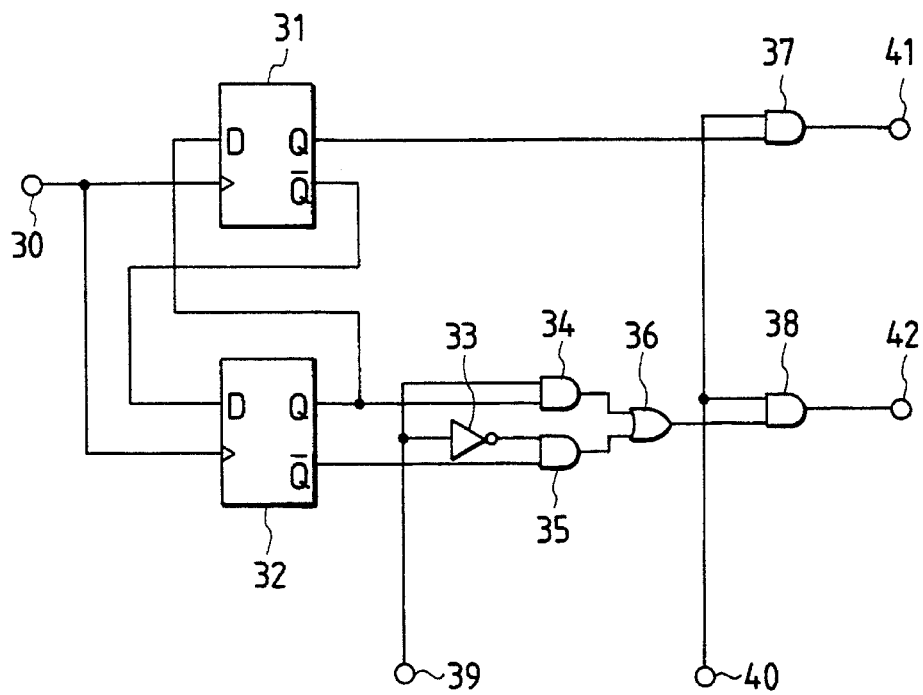
FIG. 2 is a circuit diagram showing the details of a divider & phase shifter.

FIG. 2 shows the details of the circuit of the divider & phase shifter shown in FIG. 1. In FIG. 2, the divider & phase shifter comprises D flip-flops 31 and 32, a NOT gate 33, AND gates 34, 35, 37, and 38, and an OR gate 36.

The divider & phase shifter also comprises an input terminal 30 for receiving a ×4 frequency from the VCO 3 (FIG. 1), a driving direction setting terminal 39 for setting the driving direction of the vibration wave motor, and a driving enable/disable terminal 40. When the output from the terminal 40 is at Hi level, the driving operation of the motor is enabled; when it is at Lo level, the driving operation is disabled.

Figure 3:
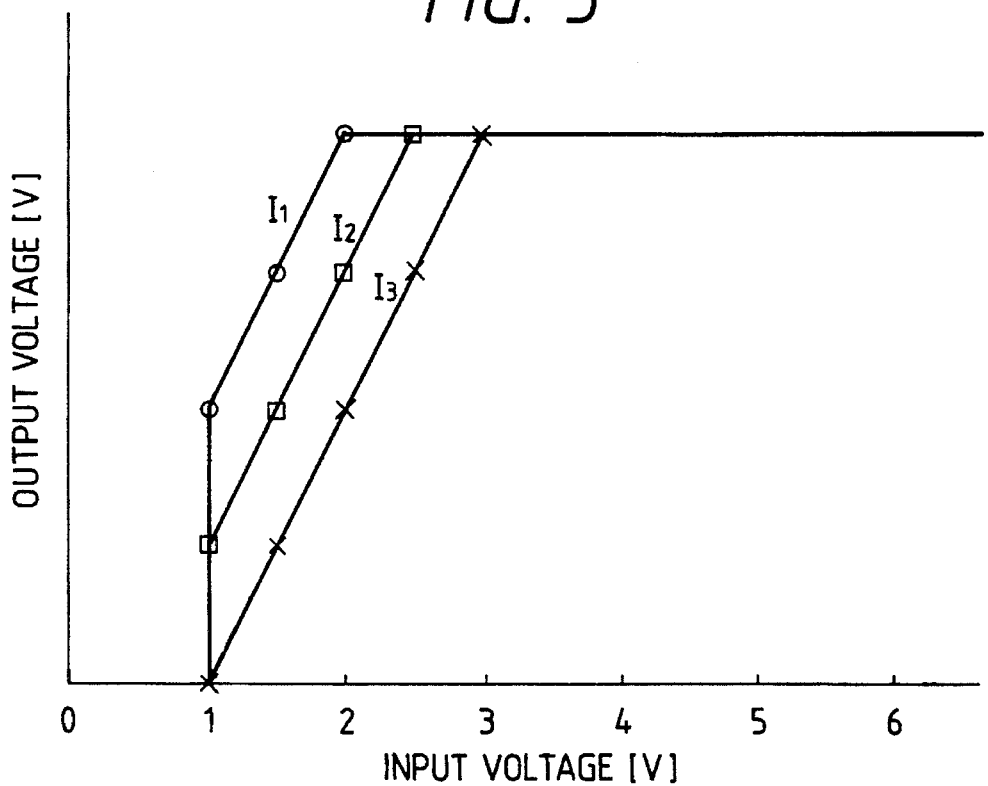
FIG. 3 is a graph showing the characteristics of a DC/DC converter used in the present invention.

FIG. 3 is a graph showing the input voltage vs. output voltage characteristics of the DC/DC converter 21 shown in FIG. 1, i.e., showing the input voltage vs. output voltage characteristics of output currents I1, I2, and I3 (I3>I2>I1). More specifically, as shown in FIG. 3, for each of I1, I2 and I3, when the input voltage drops below a predetermined level, the output voltage cannot maintain the predetermined level and decreases.

The vibration wave motor will be described below with reference to FIG. 4.

Figure 4:
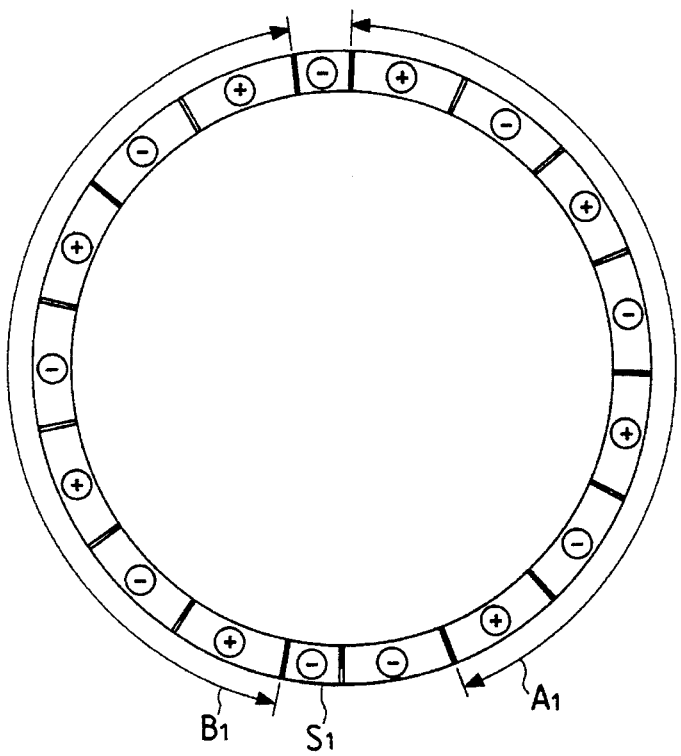
FIG. 4 is a chart showing a polarization state of a vibration wave motor.

FIG. 4 is an explanatory view showing the state of electrostrictive elements arranged on the rear surface of the stator 9b. In FIG. 4, first and second electrostrictive element groups A1 and B1 are arranged on the stator 9b to have the illustrated phase and polarization relationships. Also, a sensor electrostrictive element S1 is arranged at a position having a 45° phase difference from the first electrostrictive element group A1. These electrostrictive elements may be independently adhered to the vibrating member or may be integrally formed by polarization processing. In addition, electro-mechanical energy conversion elements such as piezoelectric elements may be used in place of the electrostrictive elements.

In FIG. 1, driving electrodes A and B respectively correspond to the first and second electrostrictive element groups. When a frequency voltage is applied to the electrodes A via the amplifier 5, and at the same time, a frequency voltage is applied to the electrodes B via the amplifier 6, a progressive vibration wave is formed on the surface of the stator 9b.

A sensor electrode S corresponds to the sensor electrostrictive element S1. When a vibration wave is formed on the surface of the stator 9b, the sensor electrostrictive element S1 outputs a frequency voltage according to the vibration state of the vibration wave, and the sensor electrode S generates the output voltage. In a resonance state, the vibration wave motor 9 has characteristics in which the driving voltage to the electrodes A and the output voltage from the sensor electrode S have the following specific phase relationship therebetween. More specifically, the phase relationship is determined by the positional relationship between the first electrostrictive element A1 to which a frequency signal is applied via the electrode A, and the sensor electrostrictive element S1. In this embodiment, in a forward rotation state, when the signal waveforms from the electrodes A and S have a 135° phase difference, the motor exhibits a resonance state; in a reverse rotation state, when they have a 45° phase difference, the motor exhibits a resonance state. As the motor is shifted from the resonance state, the above-mentioned phase difference relationship is shifted.

Figure 5:
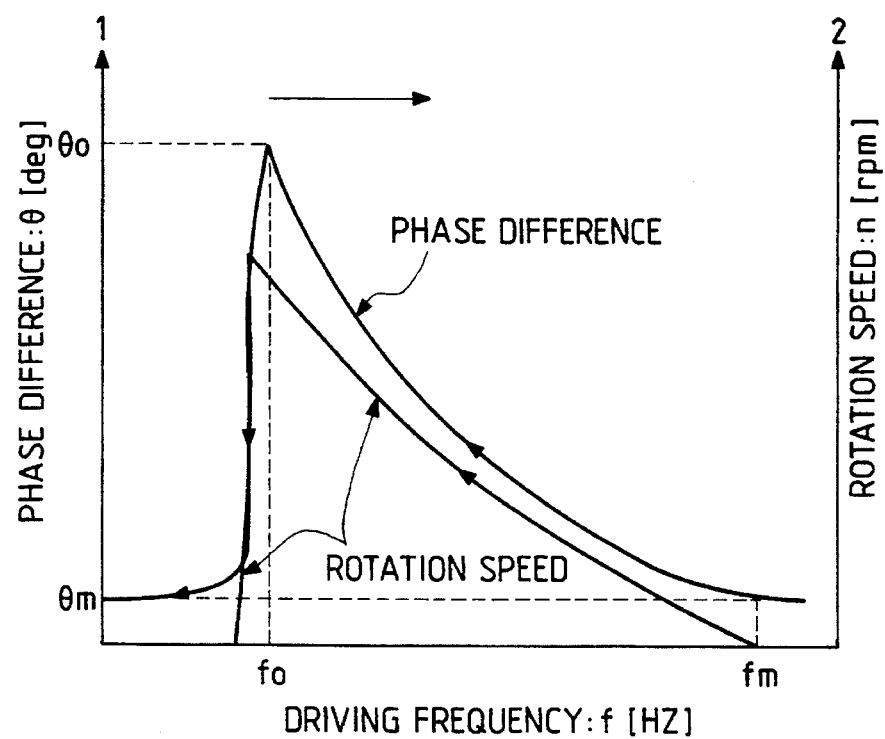
FIG. 5 is a graph showing the phase vs. rotation speed characteristics of the vibration wave motor.

FIG. 5 is a graph showing the phase characteristics of the vibration wave motor 9. A driving frequency f is plotted along the abscissa, a phase difference θ between the A and S phases is plotted along the ordinate 1, and a rotation speed n is plotted along the ordinate 2.

In FIG. 5, the phase difference becomes smaller in the upward direction of the ordinate 1 (up to a phase difference $\theta_0$ in a resonance state), the rotation speed n becomes higher in the upward direction of the ordinate 2, and the frequency f becomes higher in the right direction.

The vibration wave motor begins to operate at a given start frequency fm by scanning the driving frequency from the high frequency side to the low frequency side. Thereafter, when the driving frequency is further scanned to the side of a lower frequency, the rotation speed of the motor is increased, and the phase difference $\theta$ between the A and S phases is decreased. However, when the frequency is decreased below a resonance frequency fo, the rotation of the motor abruptly stops and the phase difference $\theta$ abruptly drifts. These characteristics are shifted to the right or left depending on the temperature or load. In particular, when the load becomes heavier, the characteristics are shifted to the right (FIG. 5).

Figure 6:
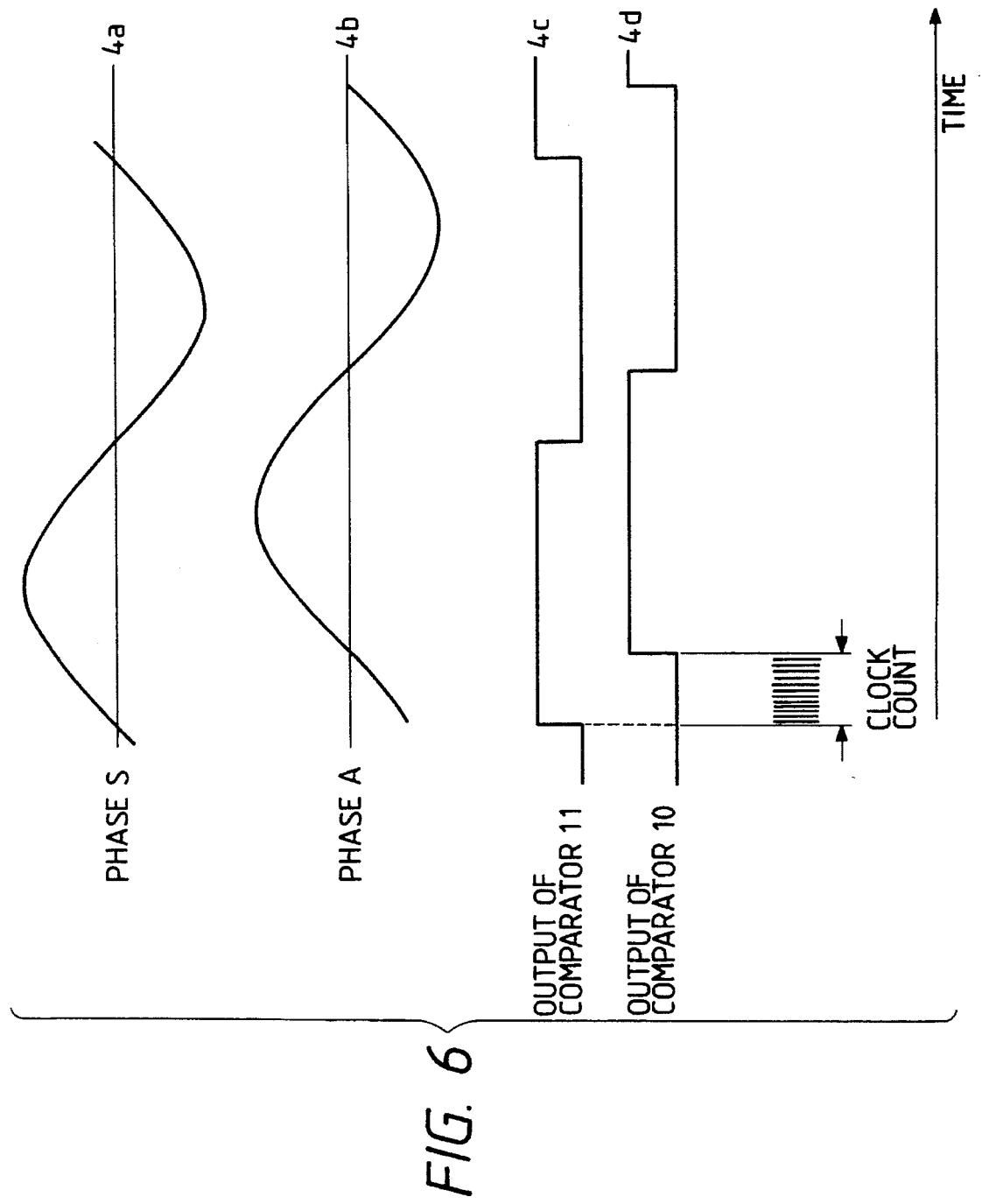
FIG. 6 is a chart showing the function and operation of a phase detection circuit.

FIG. 6 is a chart showing the principle of phase difference detection between the A and S phases, and illustrates, starting from the top, an S phase voltage waveform 4a, an A phase voltage waveform 4b, and waveforms 4c and 4d obtained by respectively converting the voltage signals 4a and 4b into digital signals through the comparators 10 and 11.

The phase detector 12 can directly measure a phase difference between the A and S phases as a digital value by counting reference clocks with a counter during a time interval from when the output from, e.g., the comparator 11 goes to Hi level until the output from the comparator 10 goes to Hi level.

For example, by counting reference clocks having a frequency 256 times the driving frequency, a phase difference between the A and S phases can be precisely measured in units of $1.4° = 360°/256$.

When the clocks are counted by, e.g., an 8-bit binary counter, the microcomputer 1 can directly read the phase difference as 8-bit data with a precision of 1LSB=1.4°.

The operation of this embodiment will be described below with reference to FIGS. 7a to 7e.

In FIGS. 7a to 7e, time is plotted along the abscissa.

Figure 7:
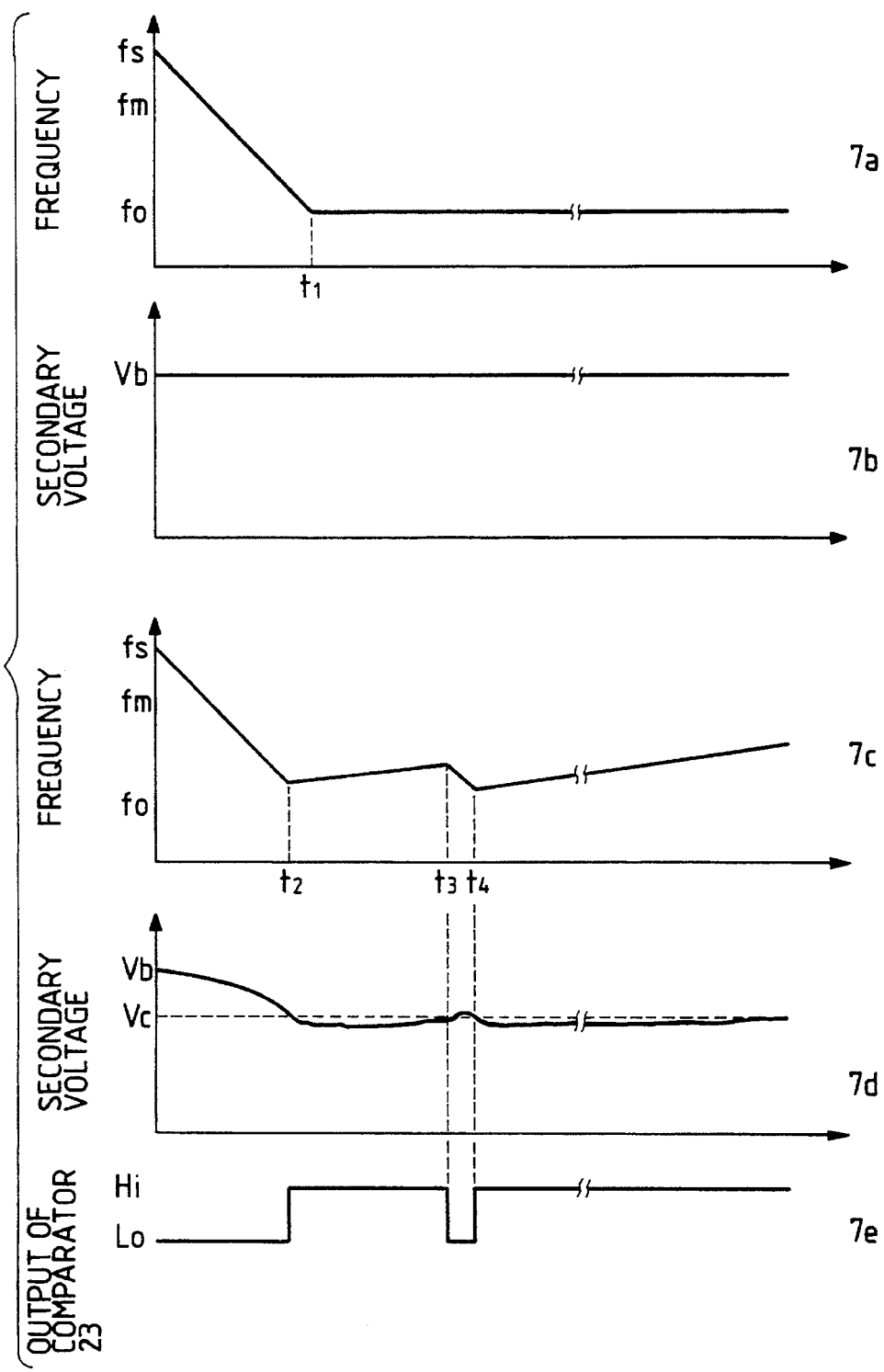
FIGS. 7a to 7c are timing charts showing the operations in the first embodiment.

In FIGS. 7a and 7c, a frequency f is plotted along the ordinate, and becomes higher in the upward direction. In FIGS. 7b and 7d, a secondary voltage of the DC/DC converter 21 is plotted along the ordinate, and becomes higher in the upward direction. In FIG. 7e, an output digital signal from the voltage comparator 23 for detecting a secondary voltage drop is plotted along the ordinate, and has Hi and Lo levels.

FIGS. 7a and 7b are explanatory views showing a case wherein the voltage of the battery 22 to be supplied to the DC/DC converter 21 is sufficiently high, and the secondary voltage of the DC/DC converter 21 is not decreased. In FIG. 7a, the vibration wave motor driving frequency is controlled by the microcomputer 1, and is scanned toward a frequency lower than the vibration wave motor start frequency fs. Meanwhile, the microcomputer 1 stops scanning of the frequency at a time $t_1$ at which one of the following conditions is satisfied, i.e., when the interval between adjacent pulse signals Generated upon rotation of the pulse plate 13 reaches a target interval, or when a phase difference between the A and S phase driving signals of the vibration wave motor 9 detected by the phase detector 12 reaches a predetermined value.

FIGS. 7c to 7e show a case wherein the voltage of the battery 22 to be supplied to the DC/DC converter 21 is decreased, and the secondary voltage of the DC/DC converter 21 is undesirably decreased according to the load. In FIG. 7c, the driving frequency of the vibration wave motor is scanned by the microcomputer 1 as in FIG. 7a. In this case, however, the secondary voltage of the DC/DC converter 21 is decreased, as shown in FIG. 7d, before the interval between the adjacent pulse signals reaches the target interval or the phase difference reaches the predetermined value. At a time t2, i.e., when the secondary voltage reaches a predetermined comparison voltage Vc, the output from the comparator 23 changes from Lo level to Hi level, and the microcomputer 1 detects this change. Then, the microcomputer 1 stops downward scanning Of the driving frequency, and shifts the driving frequency upward by a predetermined amount.

Thereafter, at a time t3, i.e., when the output voltage from the DC/DC converter 21 is recovered by increasing the frequency, and becomes higher than the voltage level Vc, the output from the comparator 23 changes from Hi level to Lo level. The microcomputer 1 scans the frequency in the lower direction again. The output from the DC/DC converter is decreased again accordingly, and at a time t4, i.e., when the output from the DC/DC converter is decreased below Vc, the output from the comparator 23 changes from Lo level to Hi level again. Then, the microcomputer 1 stops frequency scanning, and shifts the driving frequency upward by the predetermined amount. Upon repetition of the above-mentioned operations, the voltage from the DC/DC converter 21 is maintained almost at Vc as the comparison voltage.

Figure 8:
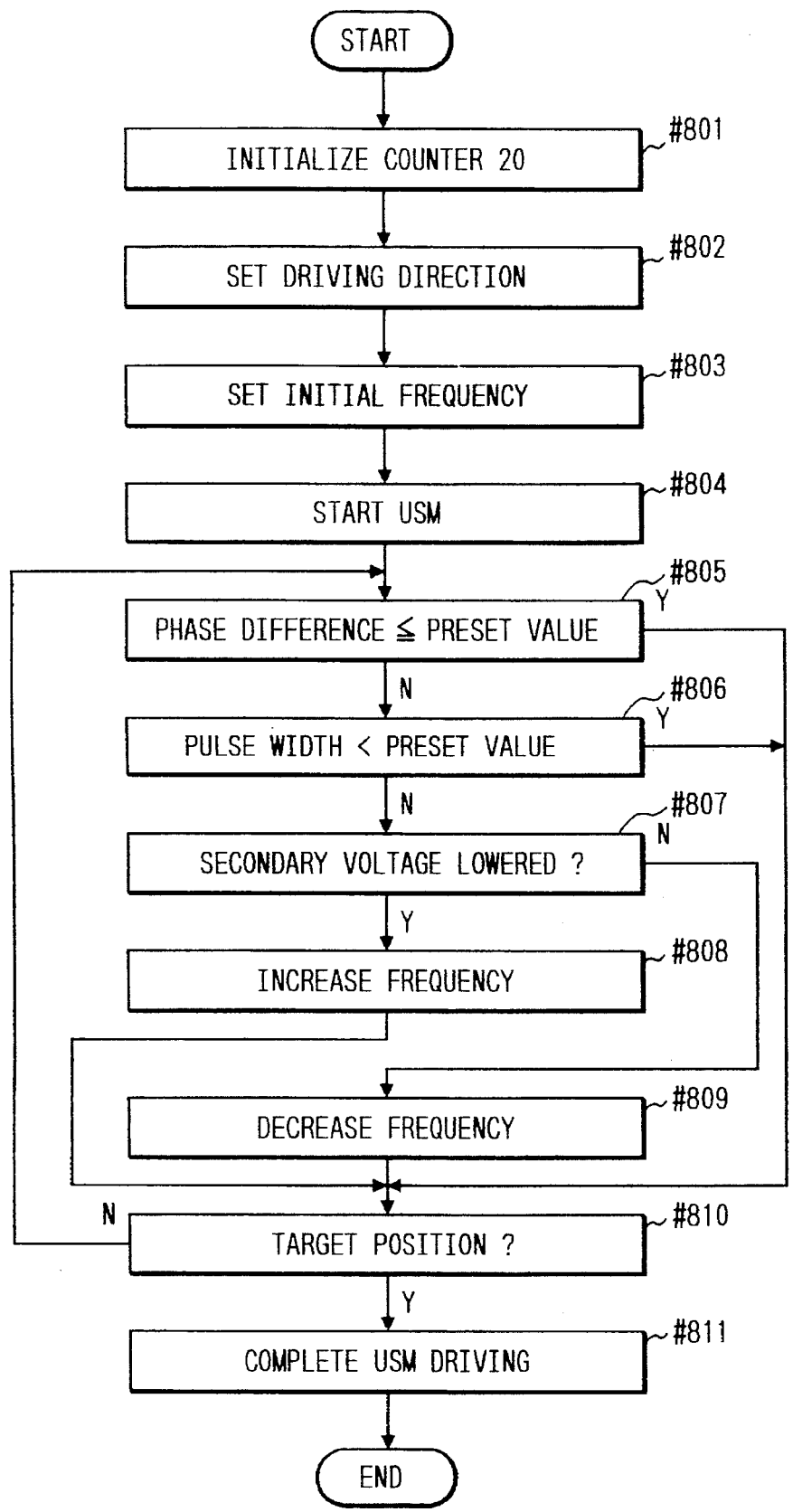
FIG. 8 is a flow chart for explaining the operation and function of the first embodiment.

The above-mentioned operations programmed in the microcomputer 1 will be described below with reference to FIG. 8.

[Step 801] The RESET terminal of the microcomputer 1 is set at Hi level for a predetermined period of time, thereby initializing the up/down counter 20. Then, the DIR1 terminal of the microcomputer 1 is set according to the driving direction of the vibration wave motor. For example, the DIR1 terminal is set at Hi level to perform a count-up operation if the driving direction is a CCW (counterclockwise) direction; it is set at Lo level to perform a count-down operation if the driving direction is a CW (clockwise) direction. Thereafter, the CNT EN/$\overline{\text{DIS}}$ terminal is set at Hi level to enable the count operation of the up/down counter 20.

[Step 802] If the driving direction of the vibration wave motor is the CCW direction, the DIR2 terminal of the microcomputer 1 is set at Hi level; if it is the CW direction, the DIR2 terminal of the microcomputer 1 is set at Lo level.

[Step 803] The output from the D/A OUT terminal of the microcomputer 1 is set to be a value corresponding to the initial start frequency fs.

[Step 804] The USM EN/$\overline{\text{DIS}}$ terminal of the microcomputer 1 is set at a Hi level to start the driving operation of the vibration wave motor.

[Step 805] If the phase difference between the A and S phases detected by the phase detector 12 is equal to or smaller than a predetermined value, the flow jumps to step 810 to end acceleration. If the phase difference is larger than the predetermined value, the flow advances to step 806 since the motor can be still accelerated.

[Step 806] The interval of pulses (the pulses directly input from the MON terminal) generated upon rotation of the pulse plate 13 is measured. If the pulse width is smaller than a predetermined value, the flow jumps to step 810 to end acceleration; if the pulse width is equal to or larger than the predetermined value, the flow advances to step 807 to accelerate the motor up to a target speed.

[Step 807] If the output from the comparator 23 is at Lo level, since this means that the output from the DC/DC converter 21 is higher than a comparison level, the flow jumps to step 809 to further accelerate the motor; if the output from the comparator 23 is at Hi level, since this means that the output from the DC/DC converter 21 is equal to or lower than the comparison level, the flow advances to step 808.

[Step 808] The frequency is increased by a predetermined amount to decelerate the vibration wave motor, and the flow then jumps to step 810.

[Step 809] The frequency is decreased by a predetermined amount to accelerate the vibration wave motor.

[Step 810] The count value of the up/down counter 20 is read from the PULSE IN input terminal of the microcomputer 1. If the count value indicates that the lens has reached a position short of before a driving target position, then the flow returns to step 805; if the count value indicates that the driving target position has been reached, the the flow advances to step 811.

[Step 811] The USM EN/$\overline{DIS}$ output terminal of the microcomputer 1 is set at Lo level to end the driving operation of the vibration wave motor.

As already discussed, the discrimination standards at step 805 are "equal to or smaller than" and "larger than". However, it readily will be apparent that the standard can be altered to "smaller than" and "equal to or larger than" respectively.

Second Embodiment

Figure 9:
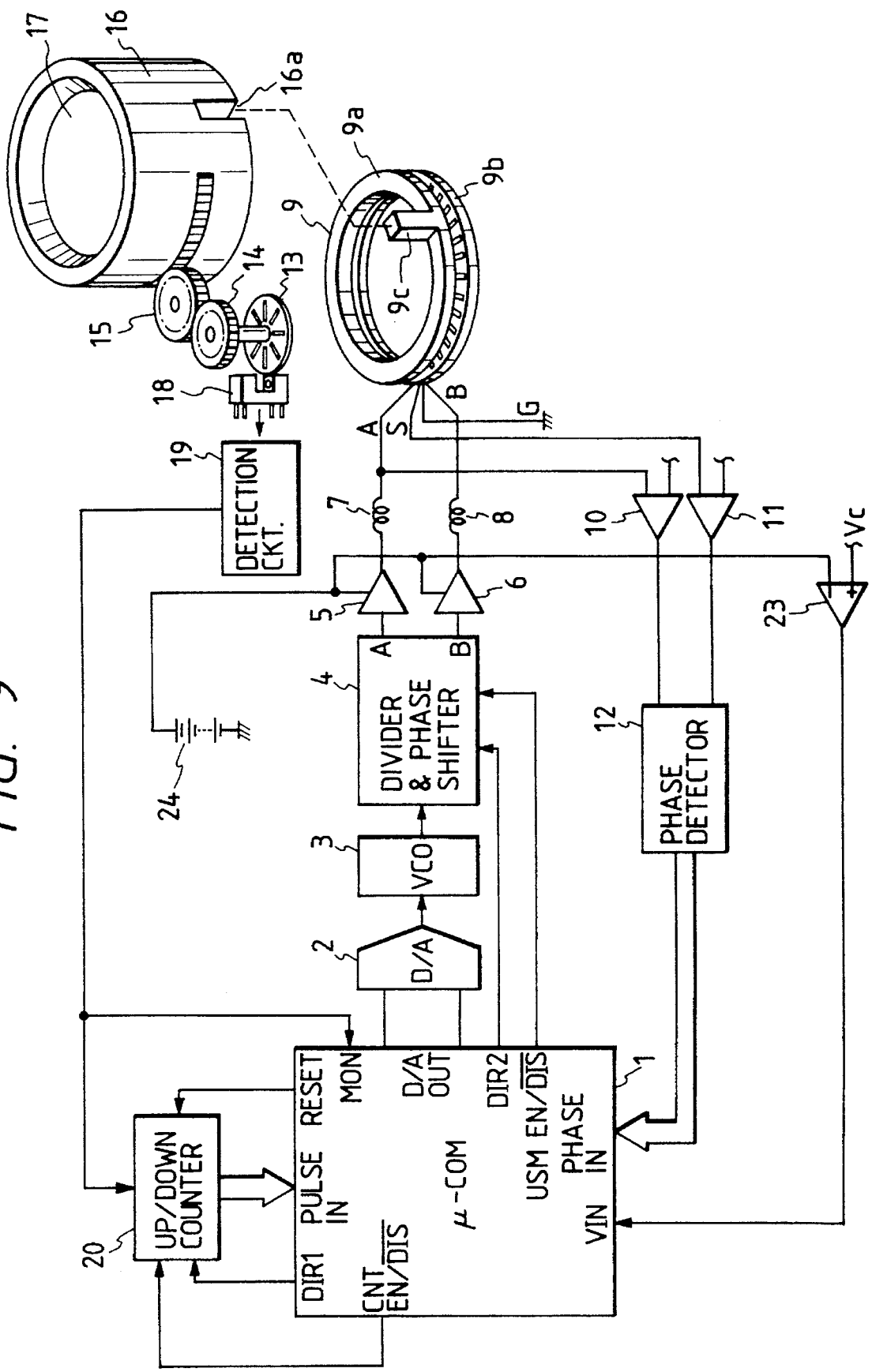
FIG. 9 is a block schematic diagram showing a second embodiment of the present invention.

FIG. 9 is a block diagram showing a second embodiment of the present invention. The same reference numerals in FIG. 9 denote the same parts as in FIG. 1, and a detailed description thereof will be omitted.

In FIG. 9, a battery 24 serves as a vibration wave motor driving power supply, and the output voltage from the battery 24 is directly used as a driving power supply voltage of the vibration wave motor.

The operation of the second embodiment will be described below with reference to FIGS. 10a to 10e.

In FIGS. 10a to 10e, time is plotted along the abscissa.

Figure 10:
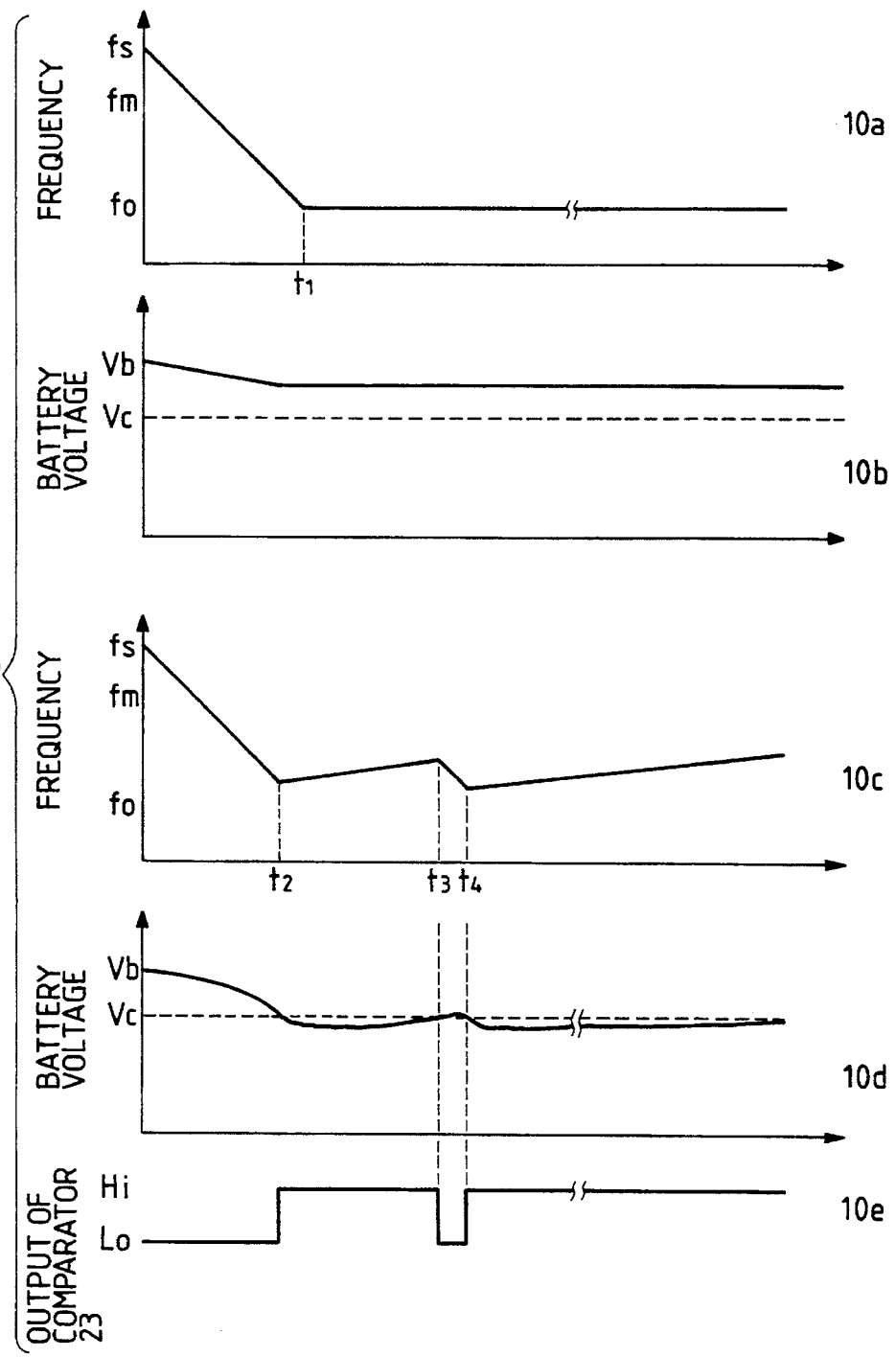
FIGS. 10a to 10e are timing charts showing the operations in the second embodiment.

In FIGS. 10a and 10c, a frequency f is plotted along the ordinate, and becomes higher in the upward direction. In FIGS. 10b and 10d, a voltage output from the driving power supply battery is plotted along the ordinate, and becomes higher in the upward direction. In FIG. 10e, a digital signal as an output from the voltage comparator 23 for detecting a driving power supply voltage drop is plotted along the ordinate, and has Hi and Lo levels.

FIGS. 10a and 10b are explanatory views showing a case wherein the vibration wave motor driving power supply battery 24 is a new one, i.e., has a sufficient voltage, and the battery voltage is not decreased below the comparison level Vc.

In FIG. 10a, the vibration wave motor driving frequency is controlled by the microcomputer 1, and is scanned toward a frequency lower than the vibration wave motor start frequency fs. Meanwhile, the microcomputer 1 stops scanning of the frequency at a time $t_1$ at which one of the following conditions is satisfied, i.e., when the interval between adjacent pulse signals generated upon rotation of the pulse plate 13 reaches a target interval, or when a phase difference between the A and S phase driving signals of the vibration wave motor 9 detected by the phase detector 12 reaches a predetermined value.

FIGS. 10c to 10e are explanatory views showing a case wherein the vibration wave motor driving power supply battery 24 is consumed, and the voltage output from the battery 24 is decreased below the comparison level according to an increase in load. In FIG. 10c, the driving frequency of the vibration wave motor is scanned by the microcomputer 1 as in FIG. 10a. However, the voltage from the driving power supply battery 24 is decreased, as shown in FIG. 10d, before the interval between the adjacent pulse signals reaches the target interval or the phase difference reaches the predetermined value. At a time t2, i.e., when the battery voltage reaches the predetermined comparison voltage Vc, the output from the comparator 23 changes from Lo level to Hi level, and the microcomputer 1 detects this change. Then, the microcomputer 1 stops scanning of the frequency, and increases the frequency by a predetermined amount.

Thereafter, at a time t3, i.e., when the voltage output from the driving power supply battery 24 is recovered by increasing the frequency, and becomes higher than the voltage level Vc, the output from the comparator 23 changes from Hi level to Lo level. The microcomputer 1 scans the frequency in the lower direction again. The voltage output from the driving power supply battery 24 is decreased again accordingly, and at a time t4, i.e., when the voltage output from the battery 24 is decreased below Vc, the output from the comparator 23 changes from Lo level to Hi level again. Then, the microcomputer 1 stops frequency scanning, and increases the frequency by the predetermined amount.

Upon repetition of the above-mentioned operations, the voltage output from the driving power supply battery 24 is maintained almost at Vc as the comparison voltage.

Figure 11:
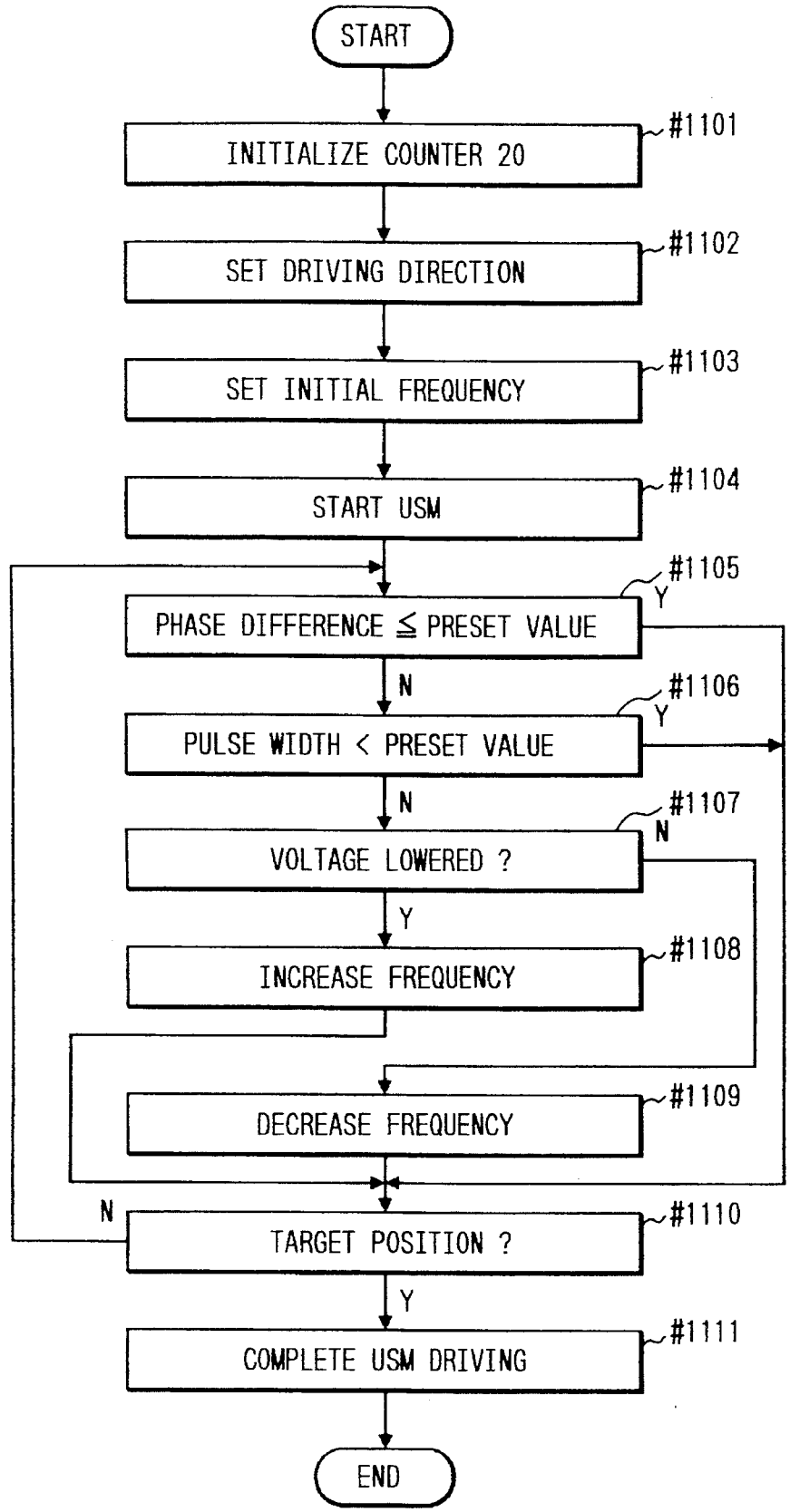
FIG. 11 is a flow chart for explaining the second embodiment.
Figure 12:
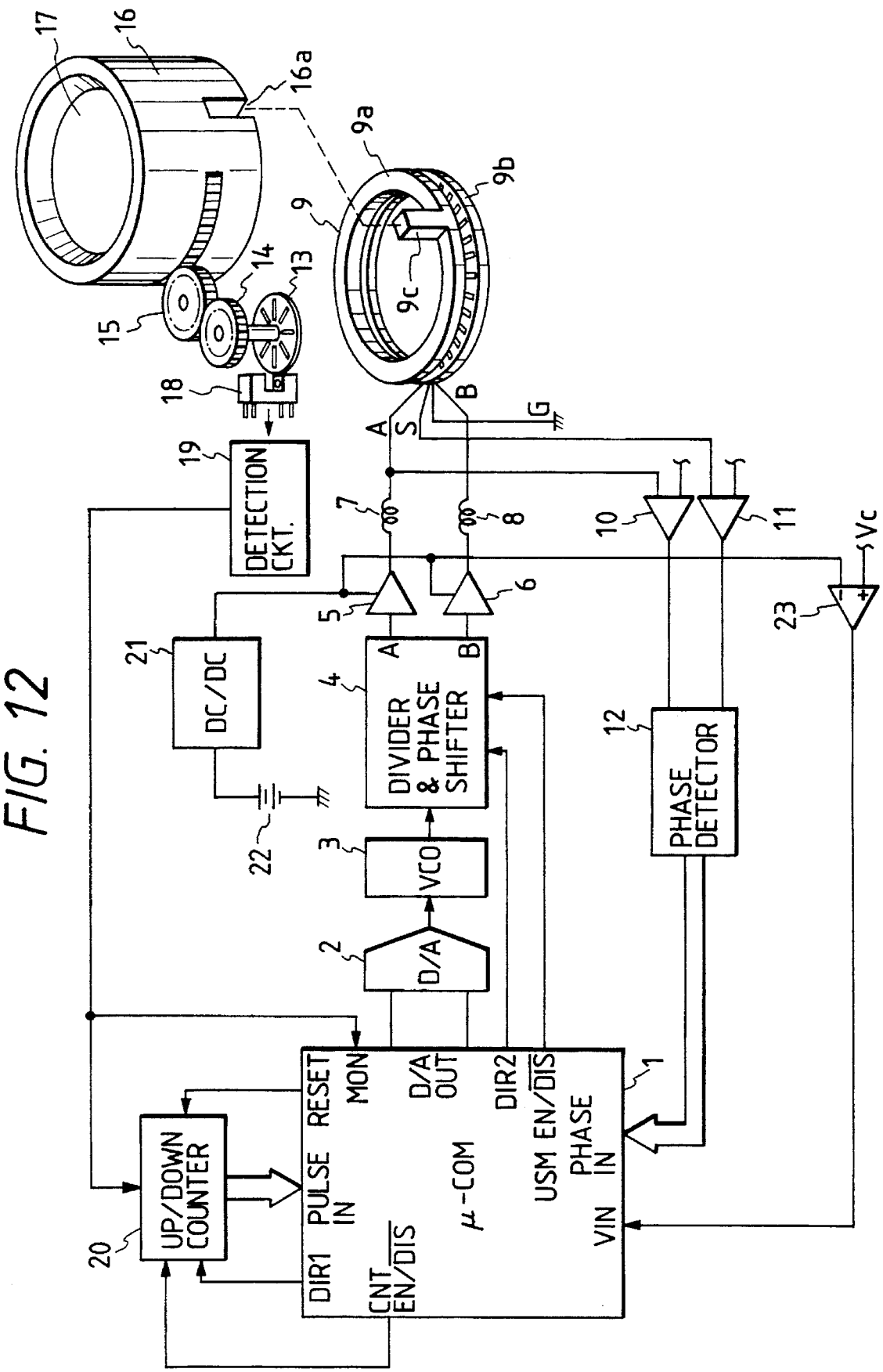
FIG. 12 is a block schematic diagram showing an arrangement according to a third embodiment of the present invention.
Figure 13:
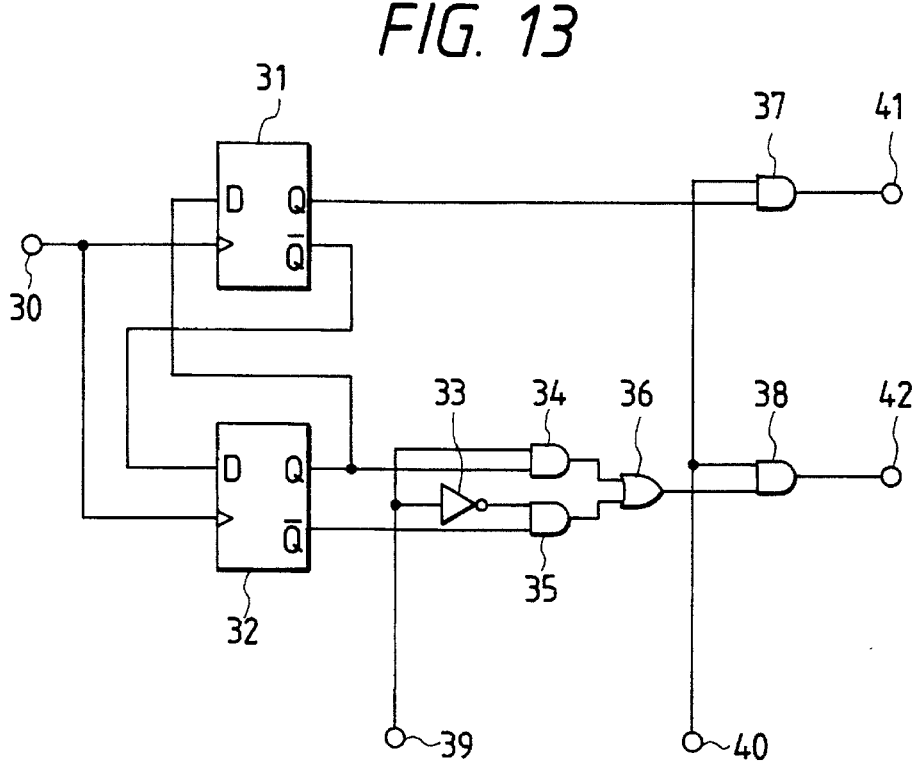
FIG. 13 is a circuit diagram showing the details of a divider & phase shifter in the third embodiment.
Figure 14:
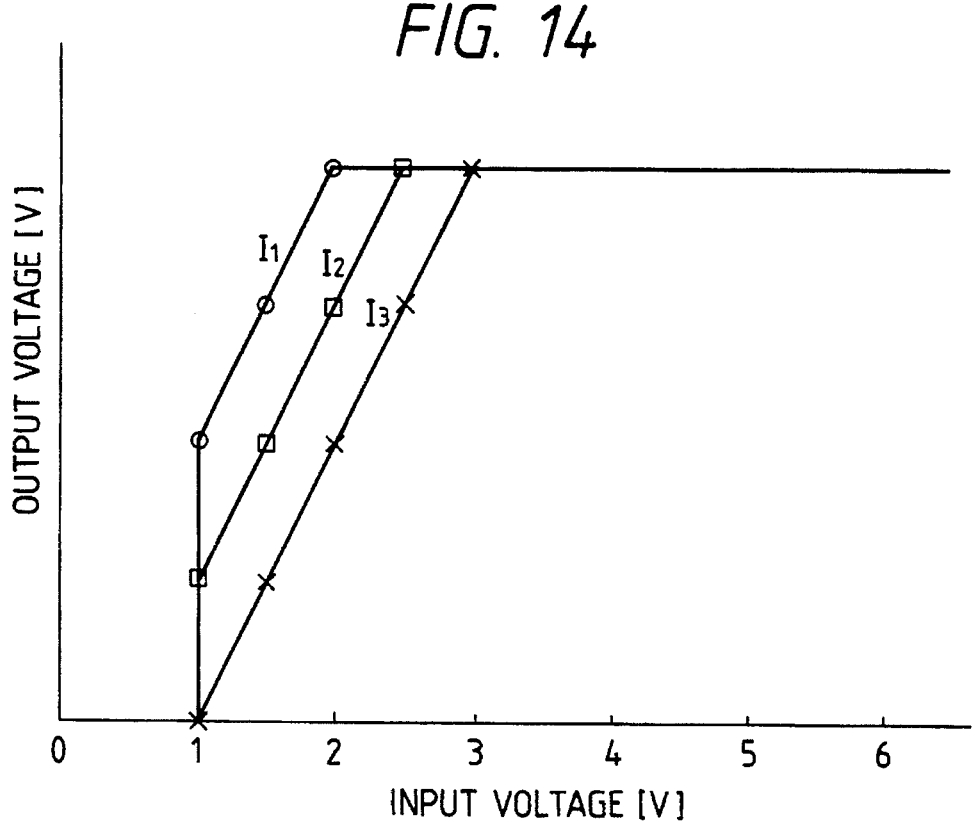
FIG. 14 is a graph showing the characteristics of a DC/DC converter in the third embodiment.
Figure 15:
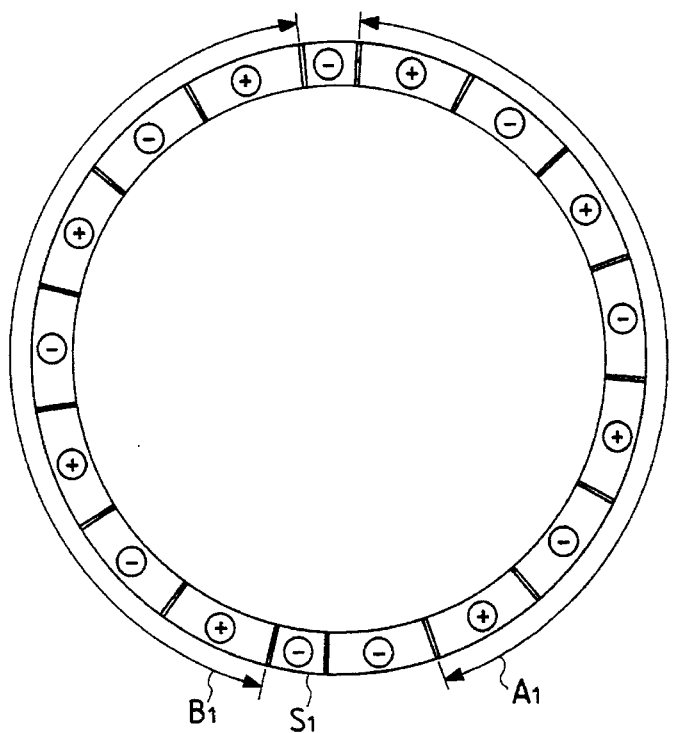
FIG. 15 is a chart showing a polarization state of a vibration wave motor.
Figure 16:
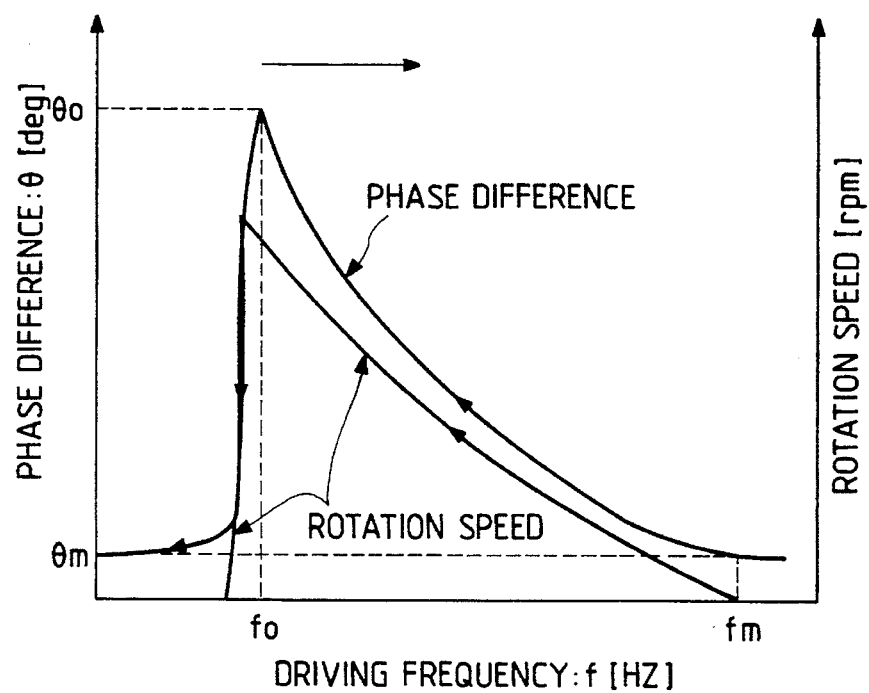
FIG. 16 is a graph showing the characteristics of the vibration wave motor.
Figure 17:
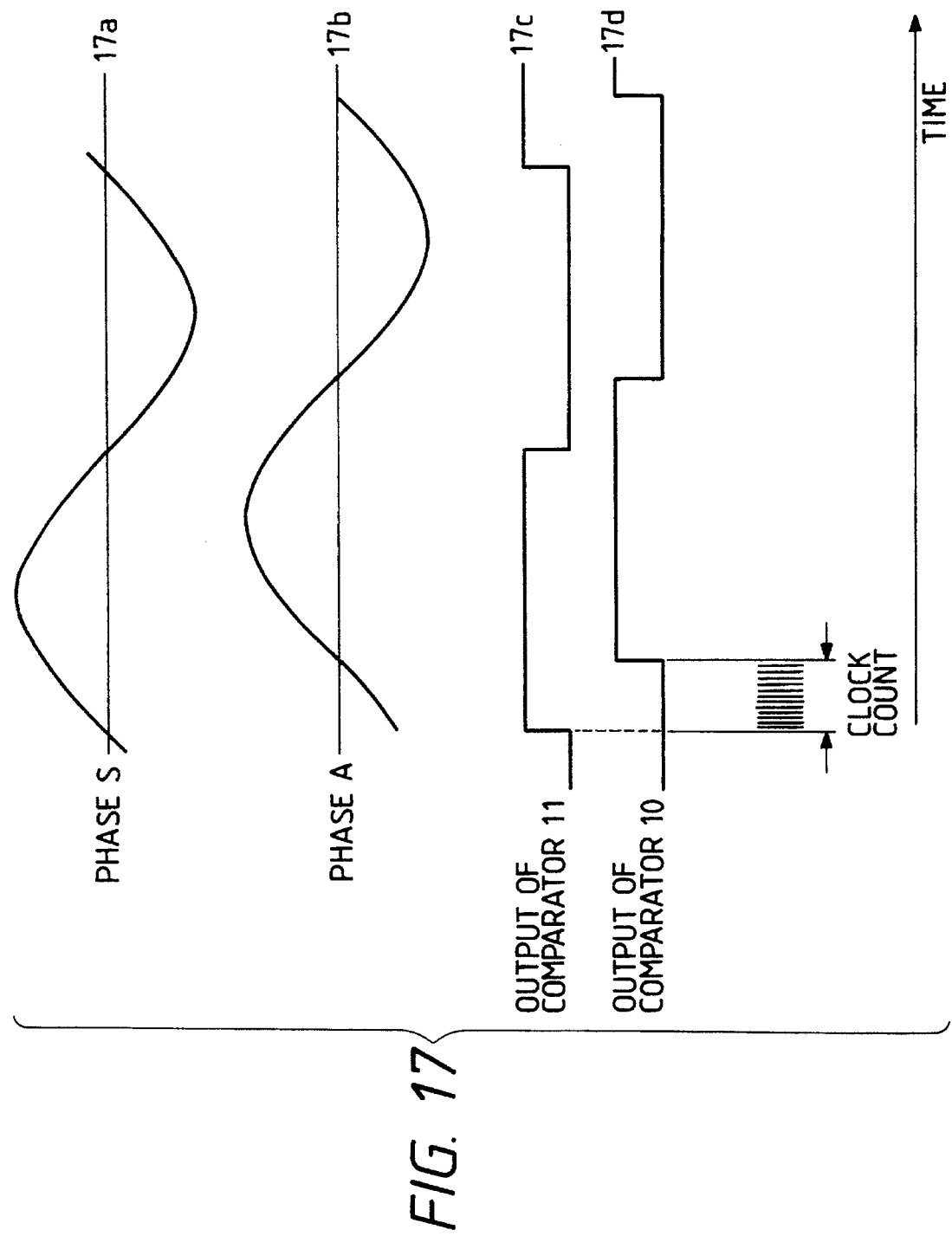
FIG. 17 is a chart showing the function and operation of the divider & phase shifter in the third embodiment.
Figure 18:
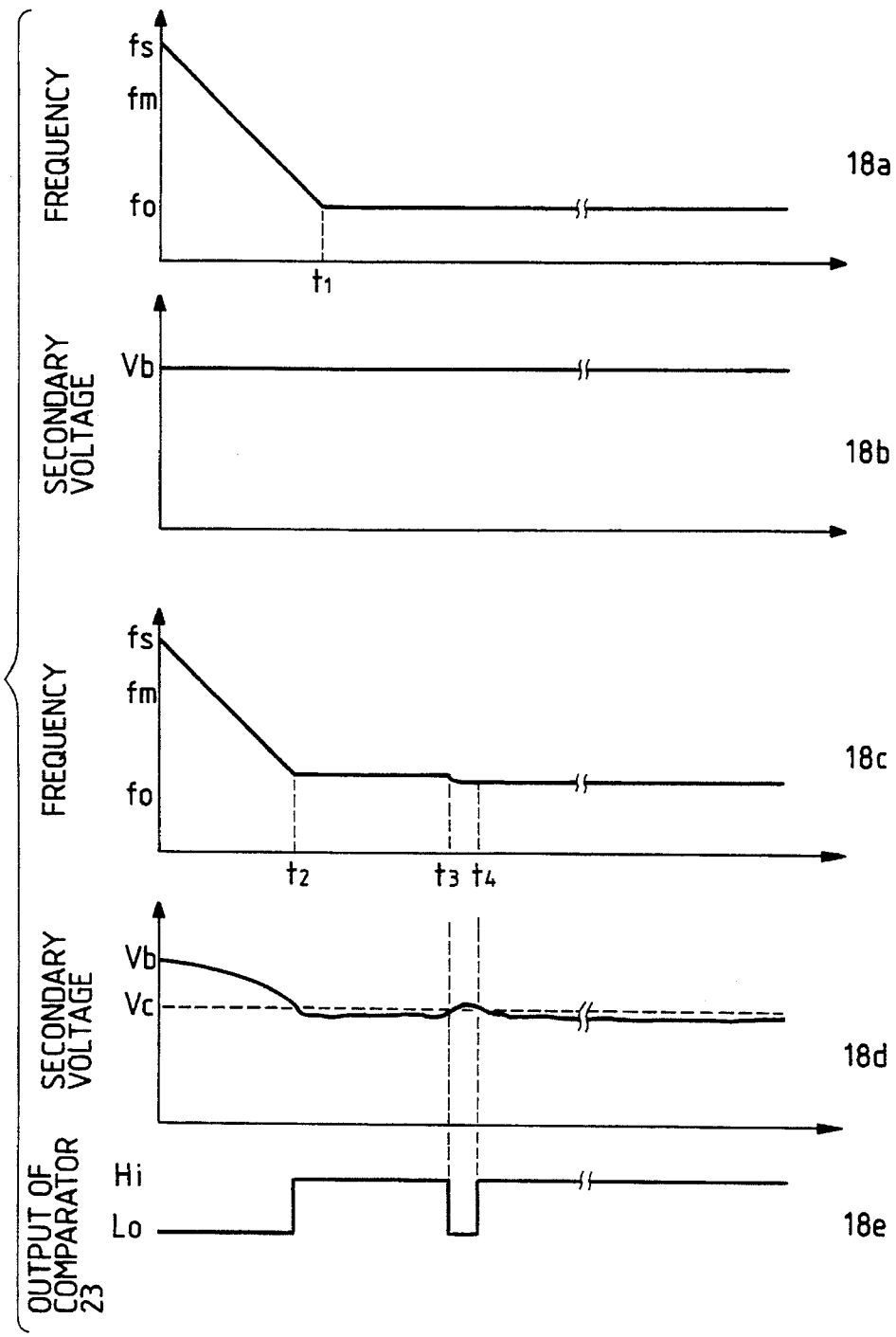
FIGS. 18a to 18e are timing charts showing the operation in the third embodiment.

The above-mentioned operations programmed in the microcomputer 1 will be described below with reference to FIG. 11.

[Step 1101] The RESET terminal of the microcomputer 1 is set at Hi level for a predetermined period of time, thereby initializing the up/down counter 20. Then, the DIR1 terminal of the microcomputer 1 is set according to the driving direction of the vibration wave motor. For example, the DIR1 terminal is set at Hi level to perform a count-up operation if the driving direction is in the CCW direction. If is set at Lo level to perform a count-down operation if the driving direction is in the CW direction. Thereafter, the CNT EN/$\overline{DIS}$ terminal is set at Hi level to enable the count operation of the up/down counter 20.

[Step 1102] If the driving direction of the vibration wave motor is in the CCW direction, the DIR2 terminal of the microcomputer 1 is set at Hi level. If it is in the CW direction, the DIR2 terminal of the microcomputer 1 is set at Lo level.

[Step 1103] The output from the D/A OUT terminal of the microcomputer 1 is set to a value corresponding to the initial frequency fs.

[Step 1104] The USM EN/$\overline{DIS}$ terminal of the microcomputer 1 is set at Hi level to start the driving operation of the vibration wave motor.

[Step 1105] If the phase difference between the A and S phases detected by the phase detector 12 is equal to or smaller than a predetermined value, then the flow jumps to step 1110 to end acceleration. If the phase difference is larger than the predetermined value, then the flow advances to step 1106 since the motor can be still accelerated.

[Step 1106] The interval of pulses generated upon rotation of the pulse plate 13 is measured. If the pulse width is smaller than a predetermined value, then the flow jumps to step 1110 to end acceleration. If the pulse width is equal to or larger than the predetermined value, then the flow advances to step 1107 to accelerate the motor up to a target speed.

[Step 1107] If the output from the comparator 23 is at Lo level, which means that the voltage output from the driving power supply battery 24 is higher than the comparison level, Vc then the flow jumps to step 1109 to further accelerate the motor. If the output from the comparator 23 is at Hi level, which means that the voltage output from the battery 24 is equal to or lower than the comparison level, then the flow advances to step 1108.

[Step 1108] The frequency is increased by a predetermined value amount to decelerate the vibration wave motor.

[Step 1109] The frequency is decreased by a predetermined value amount to accelerate the vibration wave motor.

[Step 1110] The count value of the up/down counter 20 is read from the PULSE IN input terminal of the microcomputer 1. If the count value indicates that the lens has reached a position short of the driving target position, then the flow returns to step 1105. If the count value indicates that the driving target position has been reached, then the flow advances to step 1111.

[Step 1111] The USM EN/$\overline{\text{DIS}}$ output terminal of the microcomputer 1 is set at Lo level to end the driving operation of the vibration wave motor. As already discussed, the discrimination standards at step 1105 are "equal to or smaller than" and "larger than". However, it readily will be apparent that the standard can be altered to "smaller than" and "equal to or larger than" respectively.

Third Embodiment

A third embodiment of the present invention will be described below with reference to FIGS. 12 to 19. The same reference numerals in this embodiment denote the same parts and functions as in FIGS. 1 to 6; and a detailed description thereof will be omitted. FIGS. 13 to 17 show the same contents as those in FIGS. 2 to 6.

The operation of the third embodiment will be described below with reference to FIGS. 18a to 18e.

In FIGS. 18a to 18e, time is plotted along the abscissa.

In FIGS. 18a and 18c, a frequency f is plotted along the ordinate, and becomes higher in the upward direction. In FIGS. 18b and 18d, a secondary voltage of the DC/DC converter 21 is plotted along the ordinate, and becomes higher in the upward direction. In FIG. 18e, a digital signal as an output from the voltage comparator 23 for detecting a secondary voltage drop is plotted along the ordinate, and has Hi and Lo levels.

FIGS. 18a and 18b are explanatory views showing a case wherein the voltage of the battery 22 to be supplied to the DC/DC converter 21 is sufficiently high, and the secondary voltage of the DC/DC converter 21 does not decrease. In FIG. 18a, the vibration wave motor driving frequency is controlled by the microcomputer 1, and is scanned toward a frequency lower than the vibration wave motor start frequency fs. Meanwhile, the microcomputer 1 stops scanning of the frequency at a time $t_1$ at which one of the following conditions is satisfied, i.e., when the interval between adjacent pulse signals generated upon rotation of the pulse plate 13 reaches a target interval, or when a phase difference between the A and S phase driving signals of the vibration wave motor 9 detected by the phase detector 12 reaches a predetermined value.

FIGS. 18c to 18e show a case wherein the voltage of the battery 22 to be supplied to the DC/DC converter 21 decreases, and the secondary voltage of the DC/DC converter 21 is undesirably decreased according to the load. In FIG. 18c, the driving frequency of the vibration wave motor is scanned by the microcomputer 1 as in FIG. 18a. In this case, however, the secondary voltage of the DC/DC converter 21 is decreased, as shown in FIG. 18d, before the interval between the adjacent pulse signals reaches the target interval or the phase difference reaches the predetermined value. At a time t2, i.e., when the secondary voltage reaches a predetermined comparison voltage Vc, the output from the comparator 23 changes from Lo level to Hi level. The microcomputer 1 detects this change, and stops frequency scanning.

Thereafter, at a time t3, i.e., when the output voltage of the DC/DC converter 21 recovers due to, e.g., a variation in load, and exceeds the voltage level Vc, the output from the comparator 23 changes from Hi level to Lo level. The microcomputer 1 scans the frequency in a lower direction again, and the output from the DC/DC converter is decreased again accordingly. At a time t4, i.e., when the output from the DC/DC converter is decreased below Vc, the output from the comparator 23 is inverted from Lo level to Hi level again, and the microcomputer 1 stops frequency scanning.

Figure 19:
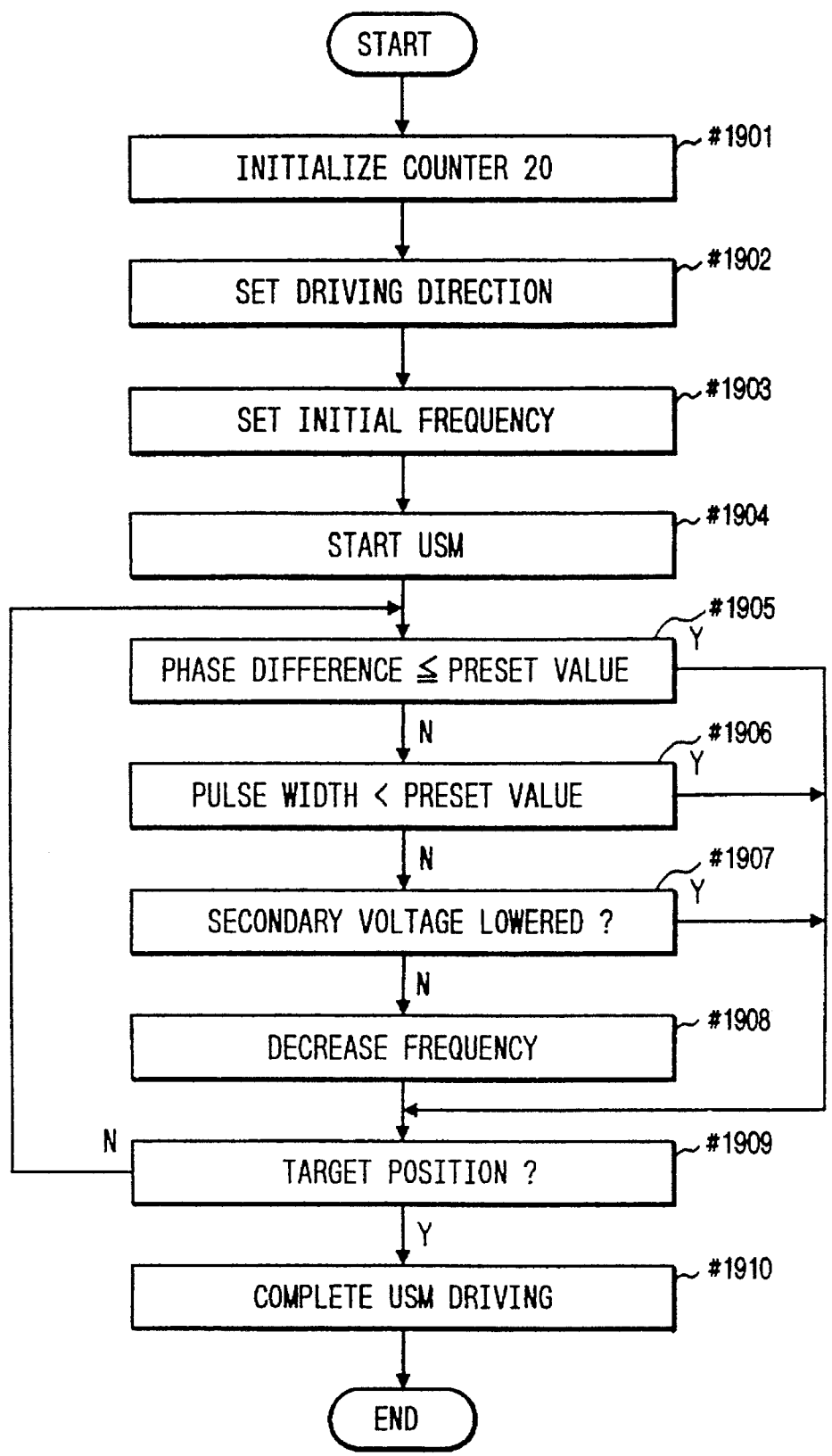
FIG. 19 is a flow chart for explaining the operation and function of the third embodiment.

The above-mentioned operations programmed in the microcomputer 1 will be described below with reference to FIG. 19.

[Step 1901] The RESET terminal of the microcomputer 1 is set at Hi level for a predetermined period of time, thereby initializing the up/down counter 20. Then, the DIR1 terminal of the microcomputer 1 is set according to the driving direction of the vibration wave motor. For example, the DIR1 terminal is set at Hi level to perform a count-up operation if the driving direction is in the CCW direction; it is set at Lo level to perform a count-down operation if the driving direction is in the CW direction. Thereafter, the CNT EN/$\overline{\text{DIS}}$ terminal is set at Hi level to enable the count operation of the up/down counter 20.

[Step 1902] If the driving direction of the vibration wave motor is the CCW direction, then the DIR2 terminal of the microcomputer 1 is set at Hi level. If it is the CW direction, then the DIR2 terminal of the microcomputer 1 is set at Lo level.

[Step 1903] The output from the D/A OUT terminal of the microcomputer 1 is set to a value corresponding to the initial frequency fs.

[Step 1904] The USM EN/$\overline{\text{DIS}}$ terminal of the microcomputer 1 is set at Hi level to start the driving operation of the vibration wave motor.

[Step 1905] If the phase difference between the A and S phases detected by the phase detector 12 is equal to or smaller than a predetermined value, then the flow jumps to step 1909 to end acceleration. If the phase difference is larger than the predetermined value, then the flow advances to step 1906 since the motor can be still accelerated.

[Step 1906] The interval of pulses generated upon rotation of the pulse plate 13 is measured. If the pulse width is smaller than a predetermined value, the flow jumps to step 1909 to end acceleration. If the pulse width is equal to or larger than the predetermined value, the flow advances to step 1907 to accelerate the motor up to a target speed.

[Step 1907] If the output from the comparator 23 is at Lo level, which means that the output from the DC/DC converter 21 is higher than a comparison level, then the flow jumps to step 1908 to further accelerate the motor. If the output from the comparator 23 is at Hi level, which means that the output from the DC/DC converter 21 is equal to or lower than the comparison level, then the flow advances to step 1909 to end acceleration.

[Step 1908] The frequency is decreased by a predetermined value to accelerate the vibration wave motor.

[Step 1909] The count value of the up/down counter 20 is read from the PULSE IN input terminal of the microcomputer 1. If the count value indicates that the lens has reached a position short of a driving target position, then the flow returns to step 1905. If the count value indicates that the driving target position has been reached, then the flow advances to step 1910.

[Step 1910] The USM EN/DIS output terminal of the microcomputer 1 is set at Lo level to end the driving operation of the vibration wave motor. As already discussed, the discrimination standards at step 905 are "equal to or smaller than" and "larger than". However, it readily will be apparent that the standard can be altered to "smaller than" and "equal to or larger than" respectively.

Fourth Embodiment

Figure 20:
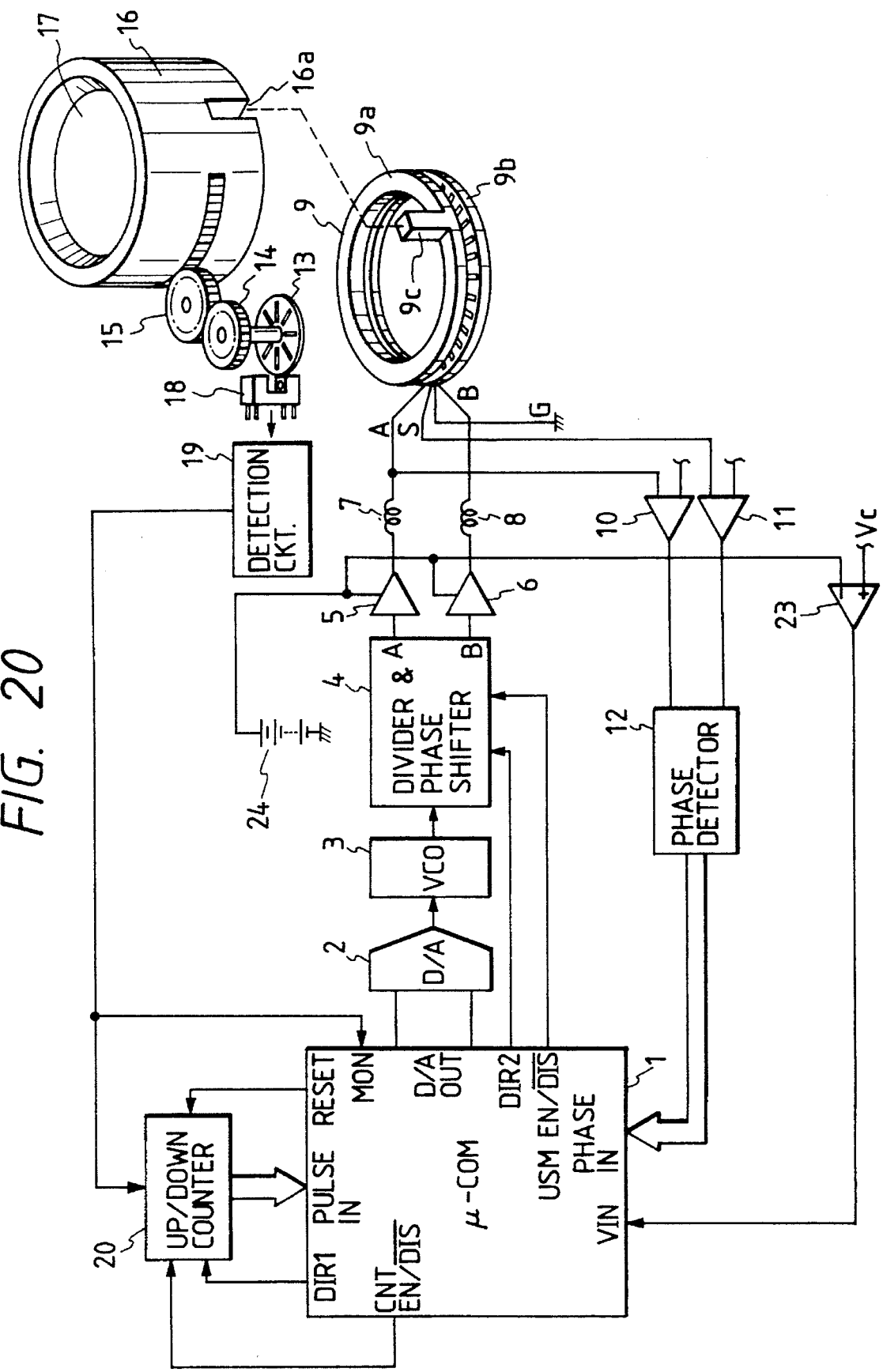
FIG. 20 is a block schematic diagram showing an arrangement according to a fourth embodiment of the present invention.

FIG. 20 is a block diagram showing a fourth embodiment of the present invention. The same reference numerals in FIG. 20 denote the same parts as in FIG. 12, and a detailed description thereof will be omitted.

In FIG. 20, a battery 24 serves as a vibration wave motor driving power supply, and the output voltage from the battery 24 is directly used as a driving power supply voltage of the vibration wave motor.

Figure 21:
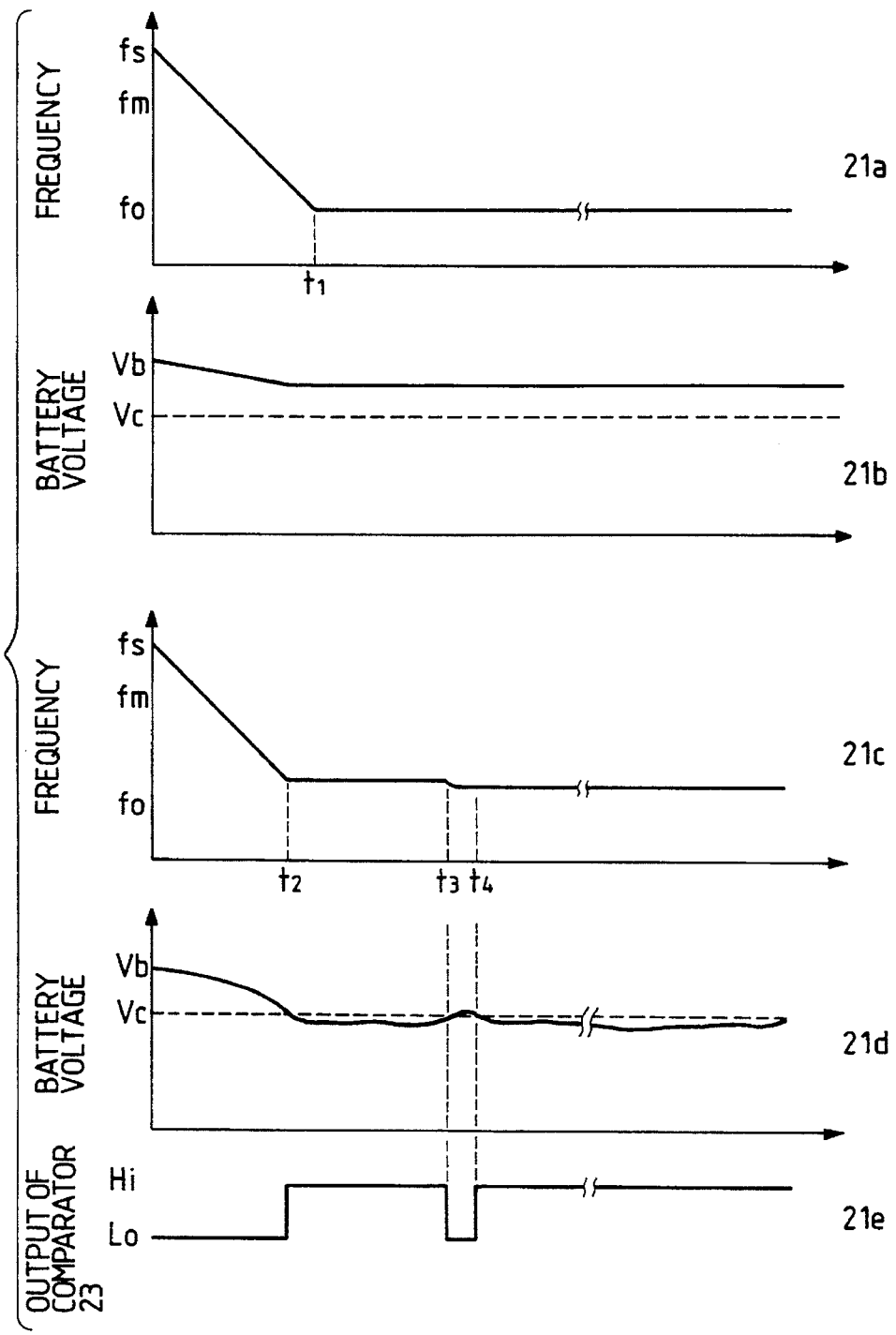
FIGS. 21a to 21e are timing charts showing the operations in the fourth embodiment.
Figure 22:
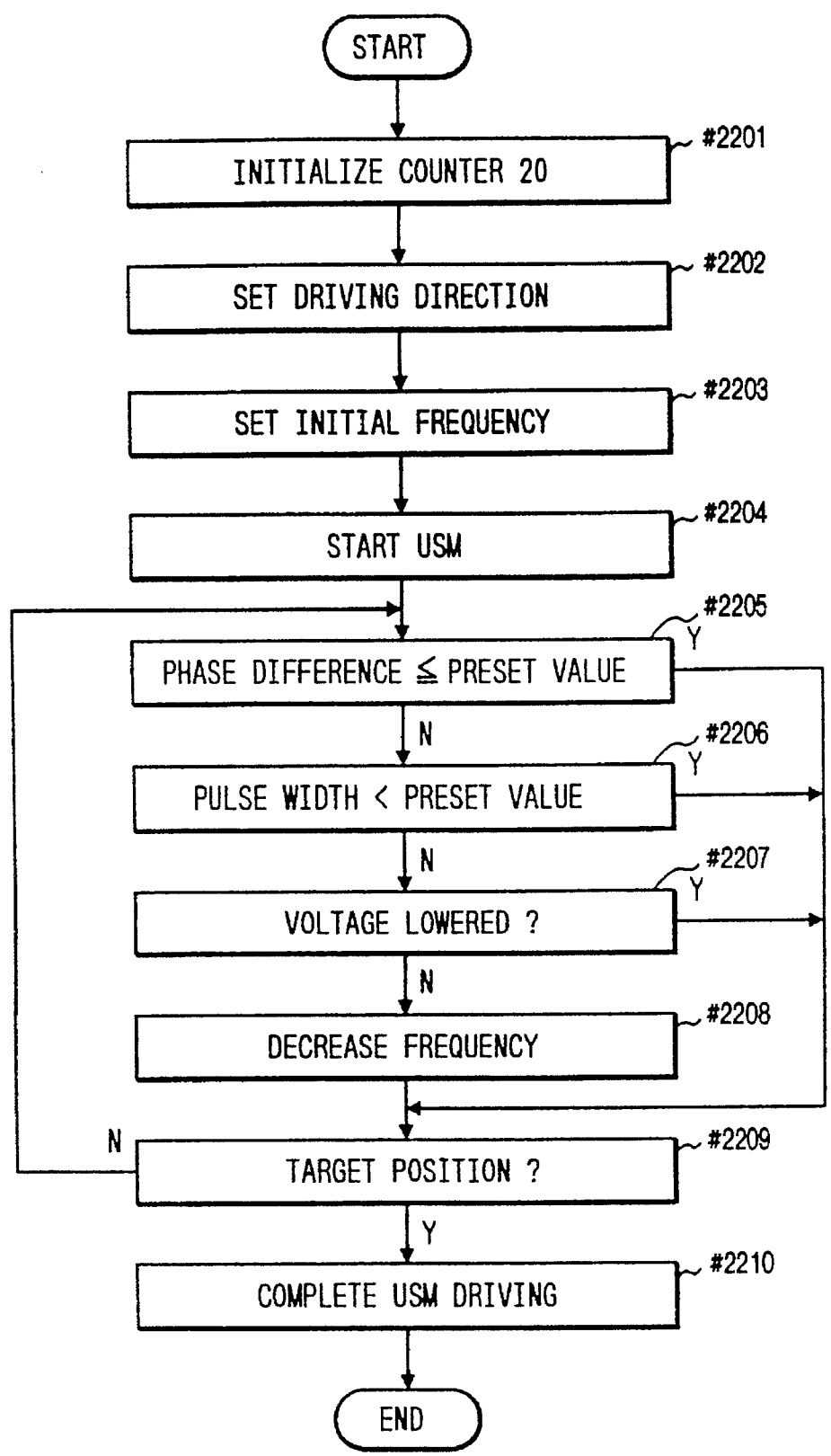
FIG. 22 is a flow chart for explaining the operation and function in the fourth embodiment.

The operation of the fourth embodiment will be described below with reference to FIGS. 20 to 22.

In FIGS. 21a to 21e, time is plotted along the abscissa.

In FIGS. 21a and 21c, a frequency f is plotted along the ordinate, and becomes higher in the upward direction. In FIGS. 21b and 21d, a voltage output from the driving power supply battery is plotted along the ordinate, and becomes higher in the upward direction. In FIG. 21e, a digital signal as an output from the voltage comparator 23 for detecting a driving power supply voltage drop is plotted along the ordinate, and has Hi and Lo levels.

FIGS. 21a and 21b are explanatory views showing a case wherein the vibration wave motor driving power supply battery 24 is a new one, i.e., has a sufficient voltage, and the battery voltage does not fall below the comparison level Vc.

In FIG. 21a, the vibration wave motor driving frequency is controlled by the microcomputer 1, and is scanned toward a frequency lower than the vibration wave motor start frequency fm. Meanwhile, the microcomputer 1 stops scanning of the frequency at a time $t_1$ at which one of the following conditions is satisfied, i.e., when the interval between adjacent pulse signals Generated upon rotation of the pulse plate 13 reaches a target interval, or when a phase difference between the A and S phase driving signals of the vibration wave motor 9 detected by the phase detector 12 reaches a predetermined value. The above-mentioned operations programmed in the microcomputer 1 will be described below with reference to FIG. 22.

[Step 2201] The RESET terminal of the microcomputer 1 is set at Hi level for a predetermined period of time, thereby initializing the up/down counter 20. Then, the DIR1 terminal of the microcomputer 1 is set according to the driving direction of the vibration wave motor. For example, the DIR1 terminal is set at Hi level to perform a count-up operation if the driving direction is a in the CW direction. If is set at Lo level to perform a count-down operation if the driving direction is in the CW direction. Thereafter, the CNT EN/DIS terminal is set at Hi level to enable the count operation of the up/down counter 20.

[Step 2202] If the driving direction of the vibration wave motor is in the CCW direction, then the DIR2 terminal of the microcomputer 1 is set at Hi level. If it is in the CW direction, the DIR2 terminal of the microcomputer 1 is set at Lo level.

[Step 2203] The output from the D/A OUT terminal of the microcomputer 1 is set to a value corresponding to the initial frequency fs.

[Step 2204] The USM EN/DIS terminal of the microcomputer 1 is set at Hi level to start the driving operation of the vibration wave motor.

[Step 2205] If the phase difference between the A and S phases detected by the phase detector 12 is equal to or smaller than a predetermined value, then the flow jumps to step 2209 to end acceleration. If the phase difference is larger than the predetermined value, then the flow advances to step 2206 since the motor can be still accelerated.

[Step 2206] The interval of pulses generated upon rotation of the pulse plate 13 is measured. If the pulse width is smaller than a predetermined value, then the flow jumps to step 2209 to end acceleration. If the pulse width is equal to or larger than the predetermined value, then the flow advances to step 2207 to accelerate the motor up to a target speed.

[Step 2207] If the output from the comparator 23 is at Lo level, which means that the voltage output from the driving power supply battery 24 is higher than a comparison level, then the flow jumps to step 2208 to further accelerate the motor. If the output from the comparator 23 is at Hi level, which means that the voltage output from the battery 24 is equal to or lower than the comparison level, then the flow advances to step 2209 to end acceleration.

[Step 2208] The frequency is decreased by a predetermined amount to accelerate the vibration wave motor.

[Step 2209] The count value of the up/down counter 20 is read from the PULSE IN input terminal of the microcomputer 1. If the count value indicates that the level has reached a position short of a driving target position, then the flow returns to step 2205. If the count value indicates that the driving target position has been reached, the flow advances to step 2210.

[Step 2210] The USM EN/DIS output terminal of the microcomputer 1 is set at Lo level to end the driving operation of the vibration wave motor.

As already discussed, the discrimination standards at step 2205 are "equal to or smaller than" and "larger than". However, it readily will be apparent that the standard can be altered to "smaller than" and "equal to or larger than" respectively.

What is claimed is:

1. A drive frequency control system for a vibration driven motor including a vibrating member which generates a vibration therein upon application of a drive frequency signal to an electro-mechanical energy conversion element thereon, and which uses the vibration as a driving force, the system comprising:

a drive circuit for generating a drive frequency signal;

a power supply for supplying an electric power to the drive circuit;

a detection circuit for detecting a power supply voltage level of the electric power supplied by said power supply to said drive circuit; and a control circuit for changing a state of frequency control of the drive frequency signal when the power supply voltage level detected by said detection circuit changes between a value equal to or less than a predetermined voltage level, and a value greater than the predetermined voltage level.

2. A system according to claim 1, wherein said control circuit inhibits a shift operation of the frequency signal in a low-frequency direction when said detection circuit detects a power supply voltage level that is less than the predetermined level.

3. A system according to claim 1, wherein said control circuit increases the frequency of the frequency signal when said detecting circuit detects a power supply voltage level that is less than the predetermined level.

4. A system according to claim 1, wherein said power supply circuit supplies electric power to the vibration driven motor using a battery output.

5. A system according to claim 1, wherein said power supply circuit comprises a DC/DC converter for boosting a battery output, and supplies electric power to the vibration driven motor using a converter output.

6. A system according to claim 2, wherein said power supply circuit supplies electric power to the vibration driven motor using a battery output.

7. A system according to claim 3, wherein said power supply circuit comprises a DC/DC converter for boosting a battery output, and supplies electric power to the vibration driven motor using a converter output.

8. A system according to claim 2, wherein said power supply circuit comprises a DC/DC converter for boosting a battery output, and supplies electric power to the vibration driven motor using a converter output.

9. A system according to claim 3, wherein said power supply circuit supplies electric power to the vibration driven motor using a battery output.

10. A system according to claim 1, wherein the vibration driven motor comprises a vibrating member for generating a progressive wave upon application of the frequency signal to said electro-mechanical energy conversion element.

11. A system according to claim 1, further comprising a frequency signal forming circuit for forming the frequency signal using the electric power from said power supply circuit.

12. A drive frequency control system for use in a vibration driven motor including a vibrating member which generates a vibration therein upon application of a drive frequency signal to an electro-mechanical energy conversion element thereon, and which uses the vibration as a driving force, the system comprising:

a drive circuit for generating a drive frequency signal;

a power supply for supplying an electric power to the drive circuit;

a detection circuit for detecting a power supply voltage level of the electric power supplied by said power supply to said drive circuit;

a frequency changing circuit for varying a frequency of the drive frequency signal; and a regulating circuit for enabling the frequency changing circuit to change the frequency of the drive frequency signal when the power supply voltage level detected by said detection circuit is greater than or equal to a predetermined value, and for regulating a changing operation of said frequency changing circuit when the power supply voltage level is less than the predetermined value.

13. A system according to claim 12, wherein said regulation circuit enables said frequency changing circuit to shift the frequency in one direction when the power supply voltage level detected by said detection circuit is greater than or equal to the predetermined value, and wherein said regulation circuit regulates the shift operation in said one direction when the power supply voltage level is less than the predetermined value.

14. A system according to claim 13, wherein said regulation circuit inhibits the shift operation in said one direction when the power supply voltage level is less than the predetermined value.

15. A system according to claim 13, wherein said regulation circuit causes said frequency changing circuit to shift the frequency in a second direction opposite to said one direction when the power supply voltage level is less than the predetermined value.

16. A system according to claim 14, wherein said power supply circuit supplies electric power to the vibration driven motor using a battery output.

17. A system according to claim 15, wherein said power supply circuit supplies electric power to the vibration driven motor using a battery output.

18. A system according to claim 14, wherein said power supply circuit comprises a DC/DC converter for boosting a battery output, and supplies electric power to the vibration driven motor using a converter output.

19. A system according to claim 15, wherein said power supply circuit comprises a DC/DC converter for boosting a battery output, and supplies electric power to the vibration driven motor using a converter output.

20. A system according to claim 12, wherein the vibration driven motor comprises a vibrating member for generating a progressive wave upon application of the frequency signal to said electro-mechanical energy conversion element.

21. A system according to claim 12, wherein said control circuit regulates a shift operation of the frequency of the frequency signal in a low-frequency direction when said detection circuit detects that the power supply voltage level is less than the predetermined value.

22. A system according to claim 13, wherein said one direction is a low-frequency direction.

23. A system according to claim 14, wherein said one direction is a low-frequency direction.

24. A system according to claim 12, further comprising a frequency signal forming circuit for forming the frequency signal using the electric power from said power supply circuit.

25. A drive frequency control system for a vibration driven motor including a vibrating member which generates a vibration therein upon application of a drive frequency signal to an electro-mechanical energy conversion element thereon, and which uses the vibration as a driving force, the system comprising:

a drive circuit for generating a drive frequency signal;

a power supply for supplying an electric power to the drive circuit;

a detection circuit for detecting a power supply voltage level of the electric power supplied by said power supply to said drive circuit;

a determining circuit for determining a frequency control factor based solely on the power supply voltage level detected by said detection circuit; and a frequency control circuit for controlling a frequency of the drive frequency signal based on the frequency control factor determined by said determining circuit.

* * * * *

UNITED STATES PATENT AND TRADEMARK OFFICE
CERTIFICATE OF CORRECTION

PATENT NO. : 5,612,598
DATED : March 18, 1997
INVENTOR(S) : HAJIME FUKUI, ET AL.

It is certified that error appears in the above-identified patent and that said Letters Patent is hereby corrected as shown below:

COLUMN 1

Line 49, "maybe" should read --may be--.

COLUMN 2

Line 1, "voltage" should read --voltage drop--.

Line 2, "motor" should read --motor driving power supply--.

Line 3, "stopped. According" should read --stopped. ¶ According--; and "one" should read --another--.

Line 4, "for, when the" should read --for--.

Line 5, should be deleted.

Line 7, "side," should read --side, when the output voltage of the vibration wave motor is detected,--.

Line 27, "7c" should read --7e--.

UNITED STATES PATENT AND TRADEMARK OFFICE
CERTIFICATE OF CORRECTION

PATENT NO. : 5,612,598

DATED : March 18, 1997

INVENTOR(S) : HAJIME FUKUI, ET AL.

It is certified that error appears in the above-identified patent and that said Letters Patent is hereby corrected as shown below:

COLUMN 5

Line 60, "Generated" should read --generated--.

COLUMN 6

Line 12, "Of" should read --of--.

COLUMN 7

Line 19, "the" (first occurrence) should read --then--.

COLUMN 8

Line 40, "If" should read --It--.

UNITED STATES PATENT AND TRADEMARK OFFICE
CERTIFICATE OF CORRECTION

PATENT NO. : 5,612,598

DATED : March 18, 1997

INVENTOR(S) : HAJIME FUKUI, ET AL.

It is certified that error appears in the above-identified patent and that said Letters Patent is hereby corrected as shown below:

COLUMN 9

Line 5, "level," should read --level--.

Line 6, "Vc" should read --Vc,--.

Line 12, "value" should be deleted.

Line 14, "value" should be deleted.

COLUMN 11

Line 47, "Generated" should read --generated--.

Line 60, "a" should be deleted; "CW" should read --CCW--; and "If" should read --It--.

Signed and Sealed this

Twenty-eighth Day of October, 1997

Attest:

BRUCE LEHMAN

*Attesting Officer*  *Commissioner of Patents and Trademarks*